United States Patent
Sufleta

(10) Patent No.: US 9,960,953 B2
(45) Date of Patent: May 1, 2018

(54) BYPASS SWITCH FOR REDUNDANT IN-LINE NETWORK SWITCH APPLIANCE

(71) Applicant: Gigamon Inc., Santa Clara, CA (US)

(72) Inventor: Zbigniew Sufleta, Cobb, CA (US)

(73) Assignee: Gigamon Inc., Santa Clara, CA (US)

( * ) Notice: Subject to any disclaimer, the term of this patent is extended or adjusted under 35 U.S.C. 154(b) by 162 days.

(21) Appl. No.: 15/006,984

(22) Filed: Jan. 26, 2016

(65) Prior Publication Data

US 2017/0214566 A1   Jul. 27, 2017

(51) Int. Cl.
*H04L 12/26* (2006.01)
*H04L 12/24* (2006.01)

(52) U.S. Cl.
CPC ................ *H04L 41/0654* (2013.01)

(58) Field of Classification Search
None
See application file for complete search history.

(56) References Cited

U.S. PATENT DOCUMENTS

| 9,674,090 | B2 * | 6/2017 | Caulfield | H04L 47/12 |
| 2004/0085994 | A1 * | 5/2004 | Warren | H04L 12/433 |
| | | | | 370/462 |
| 2007/0061056 | A1 * | 3/2007 | Valsorda | B61L 15/0036 |
| | | | | 701/20 |
| 2007/0071182 | A1 * | 3/2007 | Elder | H04M 11/007 |
| | | | | 379/45 |
| 2011/0013508 | A1 * | 1/2011 | Tuplur | H04L 45/00 |
| | | | | 370/218 |
| 2012/0198441 | A1 * | 8/2012 | Mahdavi | G06F 9/455 |
| | | | | 718/1 |
| 2014/0328163 | A1 * | 11/2014 | Del Regno | H04L 45/28 |
| | | | | 370/225 |
| 2015/0301890 | A1 * | 10/2015 | Marshall | G06F 11/1048 |
| | | | | 714/764 |
| 2016/0191613 | A1 * | 6/2016 | Srinivasan | H04L 67/10 |
| | | | | 709/201 |

\* cited by examiner

*Primary Examiner* — Phirin Sam
(74) *Attorney, Agent, or Firm* — Perkins Coie LLP

(57) ABSTRACT

Systems of redundant in-line network switch appliances are described. In an embodiment, a system includes a primary network switch appliance and a secondary network switch appliance communicatively coupled in-line between nodes on a computer network. A tool, for example for network monitoring, is communicatively coupled to the primary network switch appliance. In use, when the primary network switch appliance is in a first state, a bypass switch of the primary network switch appliance is configured to complete a communication path between the tool and a node on the computer network via a switching fabric of the primary network switch appliance. When the primary network switch appliance is in a second state, the bypass switch is configured to complete a communication path between the tool and the node on the computer network via the secondary network switch appliance, bypassing the switching fabric of the primary network switch appliance.

29 Claims, 14 Drawing Sheets

BYPASS SWITCH FOR REDUNDANT IN-LINE NETWORK SWITCH APPLIANCE

BACKGROUND

With ever-increasing amounts of data traffic on modern computer networks, network monitoring and security measures play an increasingly important role in reducing the vulnerability of a network to intrusion, unauthorized access and other security or performance issues. Tools can be deployed in a computer network to process the network traffic and provide monitoring and security services. Examples of network monitoring tools include an intrusion detection system (IDS), an intrusion prevention system (IPS), a packet sniffer, a network monitoring system, an application monitoring system, a forensic storage system, and an application security system, among others. However, such tools are only effective to the extent of the network traffic that they actually see, and any given tool will not necessarily see all of the relevant traffic on a network. Existing approaches, therefore, involve deploying multiple tools of the same type across a computer network to increase visibility to the network traffic. This approach can be expensive and difficult to scale and manage.

A network switch appliance can be coupled between nodes on a computer network to route packets to centralized tools for processing. To be more responsive to emerging security threats, many businesses and other organizations that employ computer networks are transitioning from using out-of-band tool deployments that passively monitor traffic to using in-line tool deployments. In an in-line deployment, packets originating from one node on a computer network are routed through the tool before continuing on to the intended destination node on a computer network. Systems of two or more in-line network switch appliances and associated tools can be used to improve monitoring reliability and avoid network interruptions.

BRIEF DESCRIPTION OF THE DRAWINGS

The present disclosure is illustrated by way of example, and not by way of limitation, in the figures of the accompanying drawings and in which like reference numerals refer to similar elements. The figures of the accompanying drawings depict only example embodiments of the present disclosure and are therefore not to be construed as limiting. In the drawings.

DETAILED DESCRIPTION

Overview

Introduced here are embodiments of systems of redundant network switch appliances connected in-line between communicating nodes on a computer network and configured for forwarding packets to one or more tools, for example for network monitoring. The network switch appliances include bypass switches that can be configured to alter the traffic path to a tool associated with the network switch appliances based on the states of operation of one or more of the network switch appliances. For example, a system involving two redundant in-line network switch appliances may include a primary and a secondary network switch appliance. The primary network switch appliance can include a switching fabric for forwarding packets to an externally connected tool, for example for network monitoring. In the event of a failure at the primary network switch appliance, a bypass switch can form a physical bridge to directly pass packets received from one node through the primary network switch appliance, thereby bypassing the switching fabric and avoiding interruptions in network traffic. In other words, the primary network switch appliance can operate in multiple states and the bypass switch can actuate or reconfigure depending on the state of operation of the primary network switch appliance. However, in a bypass state, packets intended to be processed by the connected tool are instead passed through the primary network switch appliance without forwarding to the tool. Assuming that processing at the tool is desired, the packets bypassing the primary network switch appliance can instead be forwarded to the tool via the secondary network switch appliance.

In some embodiments the tool is connected to both the primary and the secondary network switch appliance. However, this likely requires that the tool have two communication interfaces for coupling to both the primary and secondary network switch appliance. For tools that do not have multiple communication interfaces, an alternative arrangement is required. Further, switchover between communication interfaces can present problems where processing at the tool requires stateful analysis of the received packets. Preserving such state requires a dual interface tool with state sharing between the interfaces. Here also, for tools that do not have such capabilities, an alternative arrangement is necessary.

Instead, in some embodiments, packets bypassing a switching fabric of a primary network switch appliance are forwarded to a tool connected to the primary network switch appliance via a secondary network switch appliance, by returning the packets to the primary network switch appliance and utilizing the single communication interface between the primary network switch appliance and the tool.

Figure 1B:
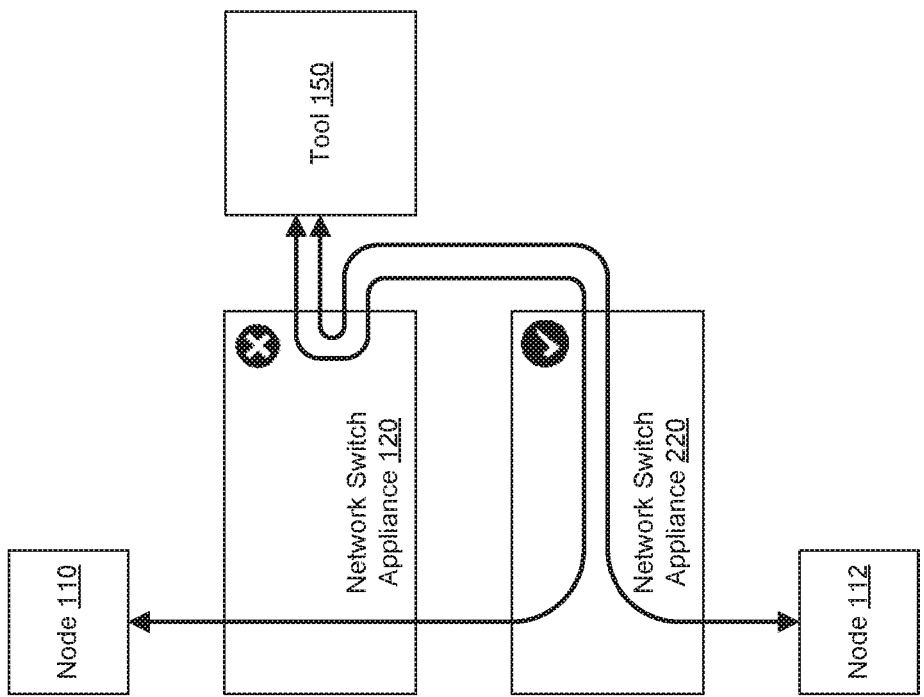
FIG. 1B illustrates at a high level packet routing through a system of network switch appliances according to a second state.
Figure 1A:
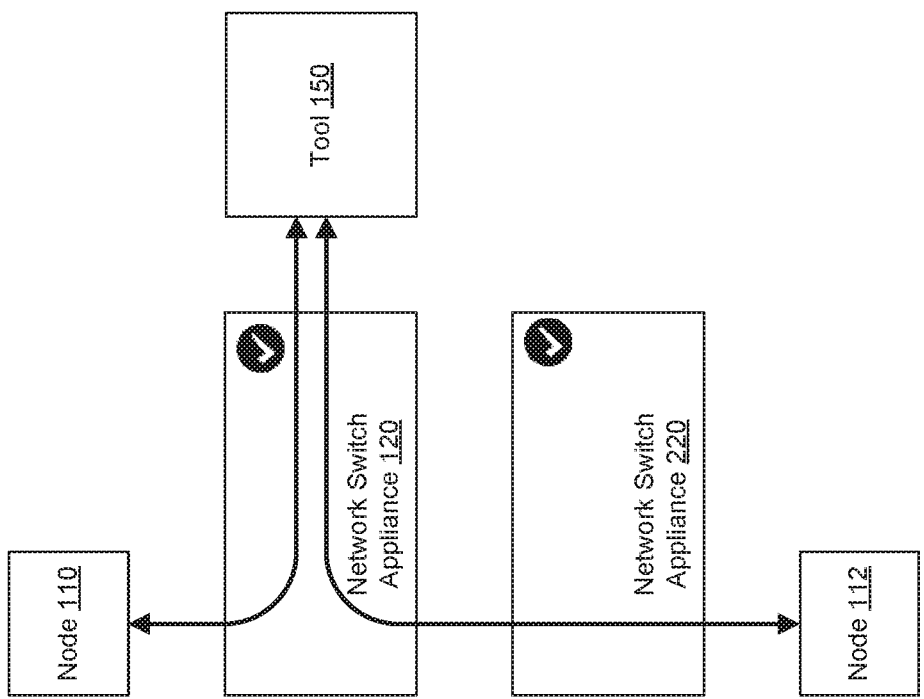
FIG. 1A illustrates at a high level packet routing through a system of network switch appliances according to a first state.

FIGS. 1A and 1B illustrate at a high level the above described concepts for packet routing through a system of network switch appliances according to a first state and a second state. As shown in FIGS. 1A-1B, an example system includes multiple network switch appliances 120 and 220 connected in-line between communicating nodes 110 and 112 on a computer network. Network switch appliance 120 is communicatively coupled to tool 150, for example for network monitoring. In this example, network switch appliance 120 operates as a primary and network switch appliance 220 operates as a backup for packet forwarding to tool 150.

The computer network may be a single network (e.g. a local area network) or may include multiple networks (e.g. the Internet). The network switch appliances 120 and 220 are configured to receive packets from and transmit packets to the nodes and to forward some or all of those packets to tool 150 for processing. As used herein, the node from which a packet originates may be referred to as a "source node," and the node to which that packet is destined may be referred to as a "destination node." The terms "source node" and destination node" are relative to a given packet. In other words, a particular node on computer network may operate as both a "source node" relative to packets it transmits and a "destination node" relative to packets it receives.

As shown in FIG. 1A, in a first operational state (e.g., a normal forwarding state), a primary network switch appliance 120 receives packets from a first external node 110 via a computer network. In this first operational state, primary network switch appliance 120 forwards received packets to external tool 150, for example for network monitoring.

Tool 150 may be an out-of-band tool (i.e., it can only receive packets intended to be communicated between two nodes, and cannot transmit such packets downstream), such as a sniffer, a network monitoring system, an application monitoring system, an intrusion detection system, a forensic storage system, an application security system, etc. In the case of an out-of-band tool, received packets may be copies of the packets routed downstream to another node. In some embodiments, all of the packets received from a source node may be copied for forwarding to the out-of-band tool for processing. In some embodiments, a subset of the packets received form a source node are selectively copied and forwarded (e.g. using packet matching criteria) to the out-of-band tool for processing. Tool 150 may also be an in-line tool that can receive packets originating from a source node, and transmit the packets back to the appliance 120 after the packets have been processed where the packets are then forwarded to a destination node. An example in-line tool may be part of an intrusion prevention system. The terms "instrument" or "tools" are not limited to discrete physical devices. For example, tool 150 may be virtualized through a combination of software and/or hardware and may, in some embodiments, be integrated (partially or completely) into the network switch appliance 120. In some embodiments, all of the packets received from a source node may be forwarded to the inline tool for processing. In some embodiments, a subset of the packets received from a source node are selectively forwarded (e.g. using packet matching criteria) to the inline tool for processing with the rest forwarded directly to the destination node or to one or more other tools.

As described earlier, primary network switch appliance 120 includes a bypass switch (not shown in FIG. 1A) that in this first state is configured to complete a communication path between the external tool 150 and the external node 110 via the switching fabric (also not shown in FIG. 1A) of the primary network switch appliance. In the case of an in-line tool, packets are returned to the primary network switch appliance 120 after processing at tool 150 and then forwarded to the destination node 112 via secondary network switch appliance 220. Here, active forwarding at the secondary network switch appliance 220 is not necessary. Like the primary network switch appliance 120, the secondary network switch appliance 220 can include a bypass switch and operate in a bypass state while the primary is operating in a normal forwarding state.

FIG. 1B illustrates packet routing by the same system described in FIG. 1A, but in a second operational state (e.g. a failure state). Here, primary network switch appliance 120 receives packets from the first external node 110 via the computer network. In this second operational state, the received packets are passed from primary network switch appliance 120 to secondary network switch appliance 220 using the bypass switch (not shown). The packets passed to secondary network switch appliance 220 are then forwarded to tool 150 by returning them to the primary network switch appliance 120. As described in more detail below, the bypass switch at primary network switch appliance 120 forms a physical bridge between a communication interface coupled to the secondary network switch appliance 220 and a communication interface coupled with tool 150, while operating in the second state. In other words, in this second state, the bypass switch is configured to complete a communication path between the tool 150 and the node 110 on the computer network via the secondary network switch appliance 220, bypassing the switching fabric of the primary network switch appliance.

Example System Including a Network Switch Appliance with a Bypass Switch

Figure 2B:
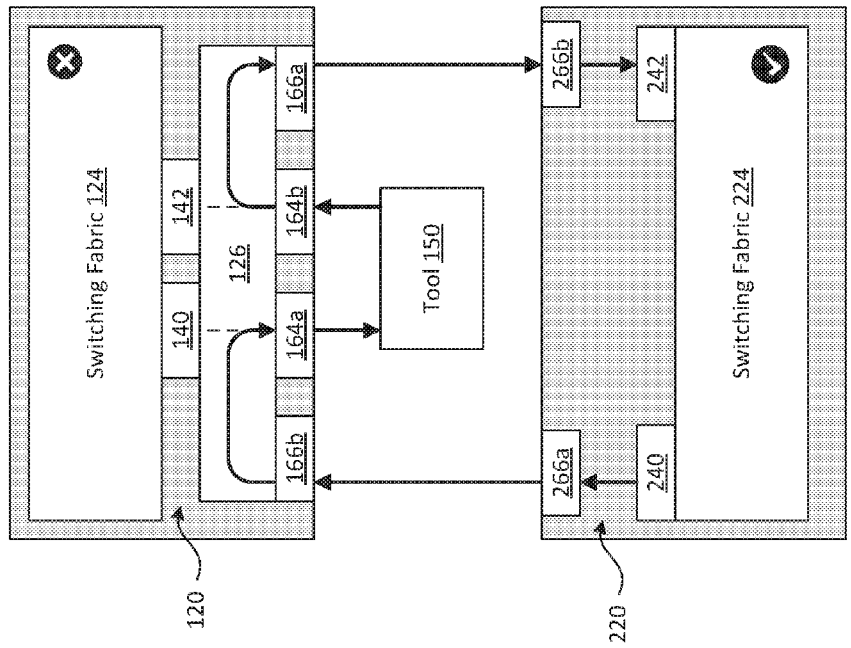
FIG. 2B illustrates operation of an example bypass switch in a network switch appliance in a second state.
Figure 2A:
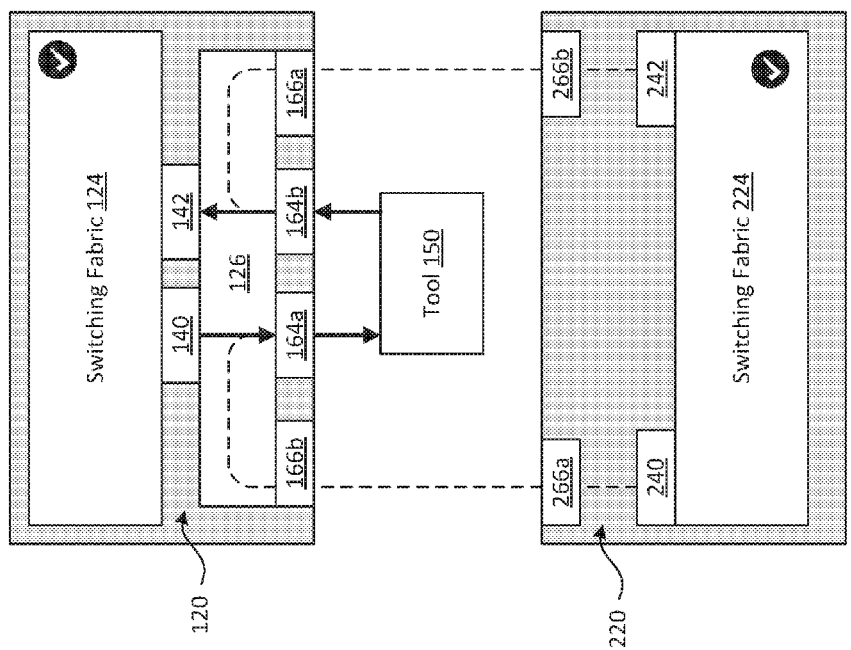
FIG. 2A illustrates operation of an example bypass switch in a network switch appliance in a first state.

FIGS. 2A and 2B illustrate operation of an example bypass switch 126 at a network switch appliance 120 in a first state (FIG. 2A) and a second state (FIG. 2B). As shown in FIGS. 2A and 2B, network switch appliance 120 includes a switch fabric 124, transceivers 140 and 142, bypass switch 126, and ports (or communications interfaces) 164a-b, and 166a-b. Network switch appliance 220 may have similar components as network switch appliance 120, but for simplicity is shown in FIGS. 2A and 2B with switching fabric 224, transceivers 240 and 242 and ports (or communications interfaces) 266a-b. The overlaid arrows represent the flow of packet traffic through the respective components of network switch appliances 120 and 220. Note, the packet traffic flow is shown in one direction in FIGS. 2A-2B, however each arrow may represent a bidirectional communications path. Network switch appliance 120 is communicatively coupled to tool 150 via tool ports 164a-b and is communicatively coupled to the second network switch appliance 220 via network ports 166a-b. Note that external nodes are not shown in FIGS. 2A and 2B for simplicity and clarity. Bypass switch 126 is communicatively coupled to switching fabric 124 (e.g. via transceivers 140 and 142) and to tool ports 164a-b and network ports 166a-b. Bypass switch 126 is shown in FIGS. 2A and 2B in a simplified form to show the two-state operation. A network switch appliance 120 can have additional bypass switch portions not shown in FIGS. 2A and 2B. As mentioned above, bypass switch 126 can be configured to operate in each of multiple states. In some embodiments, bypass switch 126 includes one or more relays that each can operate in two states, a relays-open state and a relays-closed state. In some cases, the bypass switch 126 can include physical relays that can be opened or closed in response to one or more control signals. In other cases, the bypass switch 126 can include logical relays that are implemented using software. The relays may be solid-state relays (e.g., transistor-based), for example. Alternatively, the relays could be electromagnetic coil-based relays or any other known or convenient type of relay.

As shown in FIG. 2A in the relays-open state, each of the tool ports 164a-b of the network switch appliance 120 are communicatively coupled with the switching fabric 124 via transceivers 140 and 142. Traffic arriving at the network switch appliance 120 from a source node (not shown) is allowed to be forwarded to tool 150 by switching fabric 124 via tool port 164a. Likewise, where tool 150 is an inline tool, traffic returned to network switch appliance 120 via tool port 164b is allowed to pass to switching fabric 124 for forwarding to a destination node (not shown). Thus, when the relays in the bypass switch 126 are opened, the network switch appliance 120 is in a forwarding state.

As shown in FIG. 2B, in the relays-closed state, tool ports 164a-b are communicatively coupled with network ports 166a-b of the network switch appliance 120. As a result packets arriving from a second network switch appliance 220 via network port 166b are automatically passed to tool 150 via tool port 164a. Likewise, where tool 150 is an in-line tool, packets returned from tool 150 via tool port 164b are automatically passed to network switch appliance 220 via network port 166a. In this state, traffic bypasses switching fabric 124 of network switch appliance 120.

In some embodiments, bypass switch 126 is configured to open or close its relays automatically based on the state of network switch appliance 120 and/or a received signal. For example, in some embodiments, bypass switch 126 is in an relays-open state when network switch appliance 120 is powered and enters a relays-closed state when network switch appliance 120 is powered down or unexpectedly loses power. In some embodiments a controller (not shown) internal or external to network switch appliance 120 can output a state signal recognizable to bypass switch 126 as a control signal. For a two state bypass switch 126, this state signal could simply be the presence or absence of signal. Such a controller can be configured to detect a state (or monitor the operation) of network switch appliance 120 and output a state signal to bypass switch 126. For example, based on its monitoring, a controller can detect a first state (e.g. normal operation) if the operation of the network switch appliance 120 satisfies a specified criterion and detect a second state (e.g. failure) if the operation of the network switch appliance does not satisfy the specified criterion.

Figure 3A:
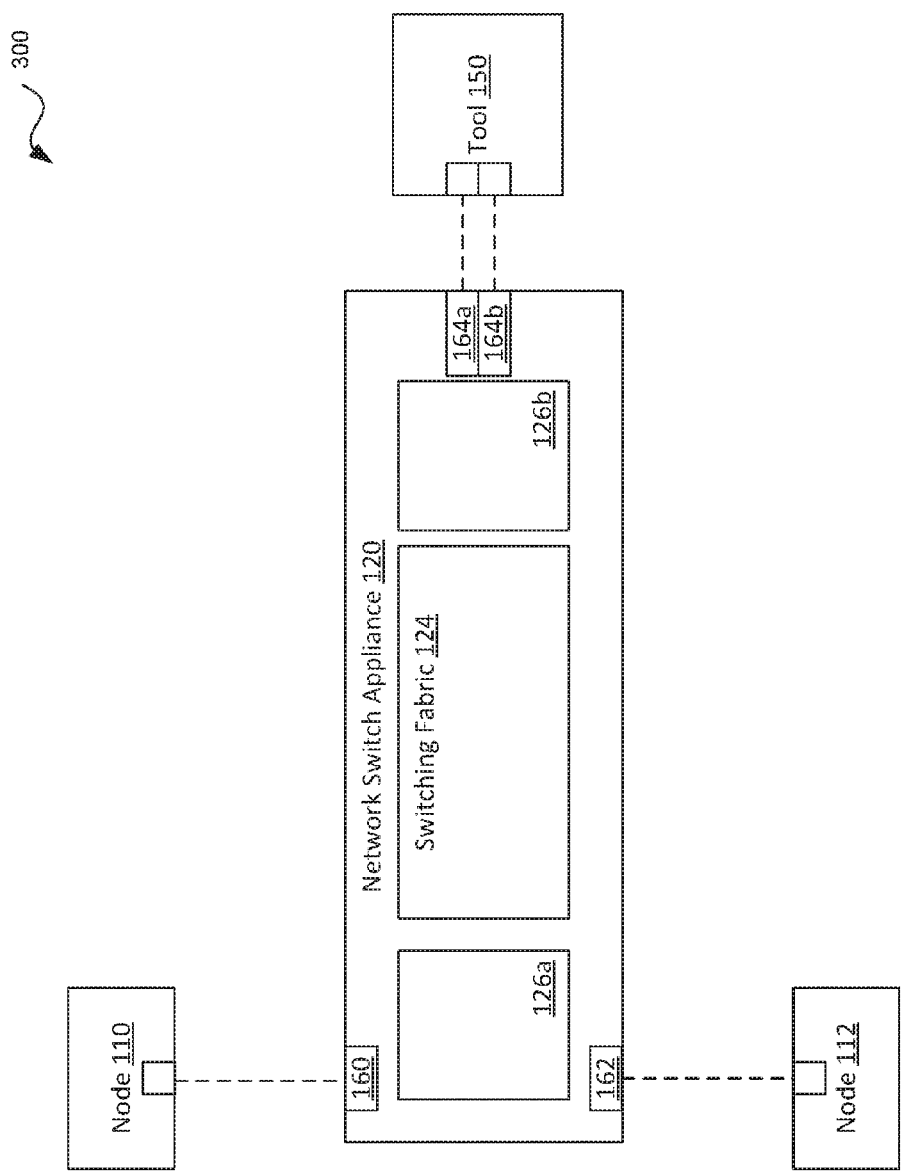
FIG. 3A shows an example network switch appliance that includes a bypass switch.
Figure 3B:
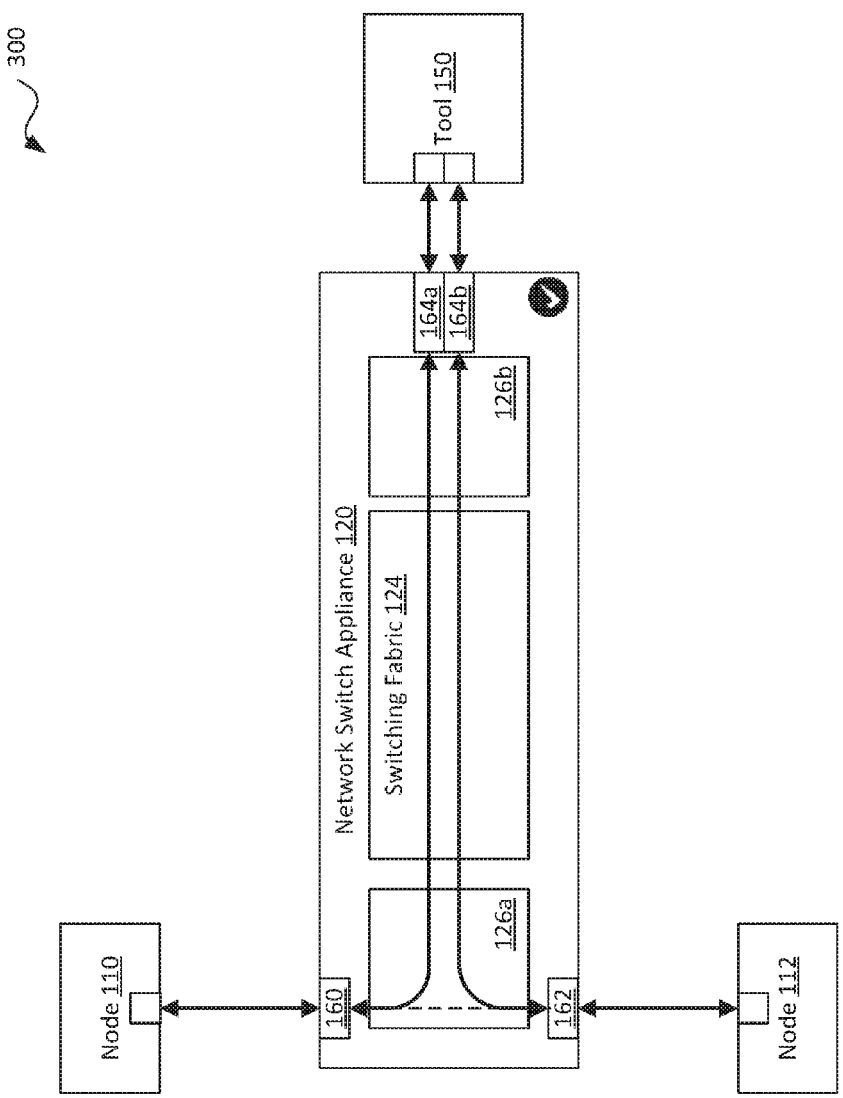
FIG. 3B illustrates the routing of packets through the network switch appliance of FIG. 3A when in a first state.
Figure 3C:
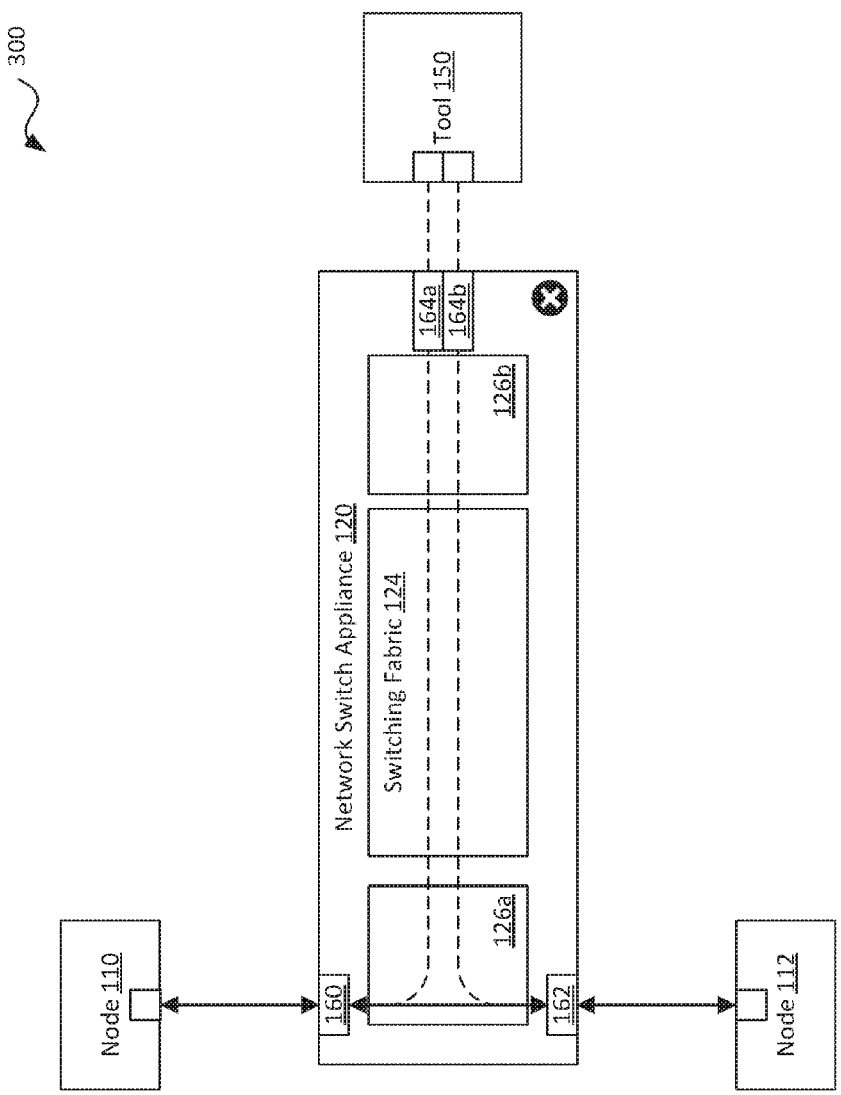
FIG. 3C illustrates the routing of packets through the network switch appliance of FIG. 3A when in a second state.

FIGS. 3A-3C further illustrate operation of a bypass switch at a network switch appliance 120, similar to that described with respect to FIGS. 2A and 2B. FIGS. 3A-3C show example system 300 including a single network switch appliance 120 connected in-line between communicating nodes 110 and 112 on a computer network and communicatively coupled to tool 150, for example for network monitoring. The network switch appliance 120 includes a first network port 160, a second network port 162, a first tool port 164a and a second tool port 164b. Network ports (e.g. network port 160, 162) are configured to, in use, be communicatively coupled with nodes (e.g. nodes 110, 112, or a second network switch appliance[not shown]). Tool ports are configured to, in use, be communicatively coupled with a tool (e.g. tool 150). Tool ports may also be referred to herein as "instrument ports." Both network ports and tool ports can be collectively referred to as "ports" or "communications interfaces." Further, although network ports and tool ports may be separately described herein, this is done so for clarity and shall not be construed as limiting. In some embodiments network ports and tool ports share the same features and may be interchangeable. For example a given communications interface may function as a tool port when connected to a tool and as a network port when connected to a node via a computer network.

Figure 4A:
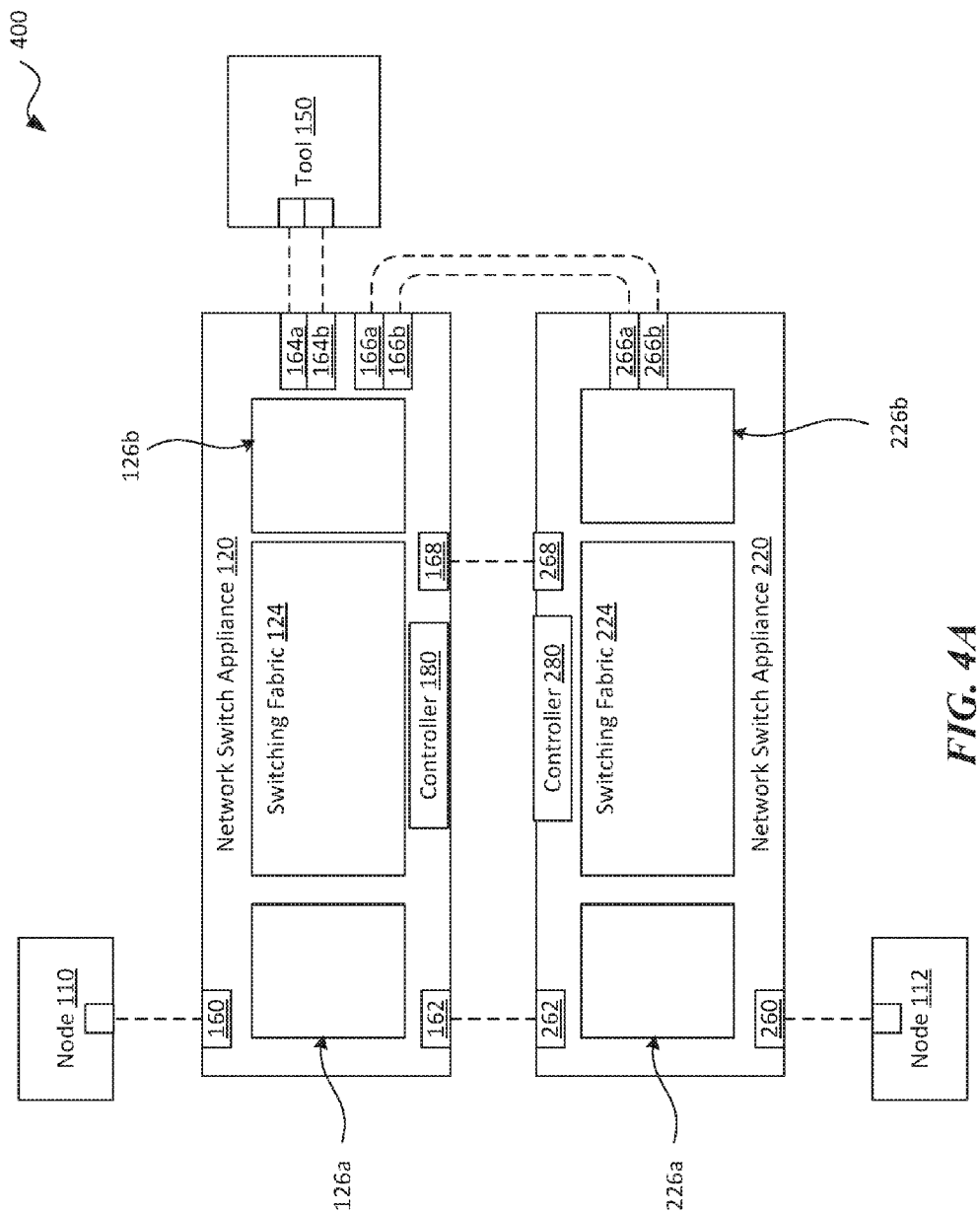
FIG. 4A shows an example system of redundant in-line network switch appliances with bypass switches.
Figure 4B:
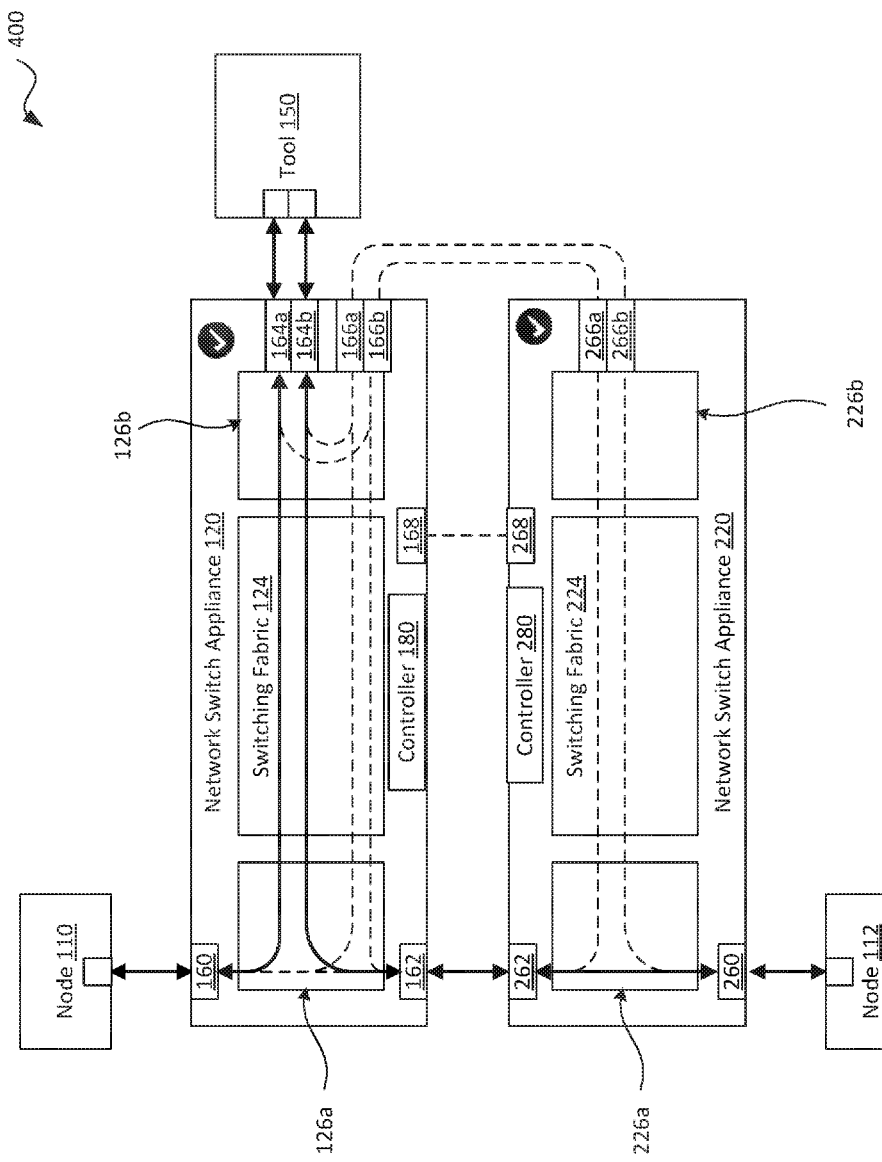
FIG. 4B illustrates the routing of packets through the system of FIG. 4A when a primary network switch appliance is in a first state.
Figure 4C:
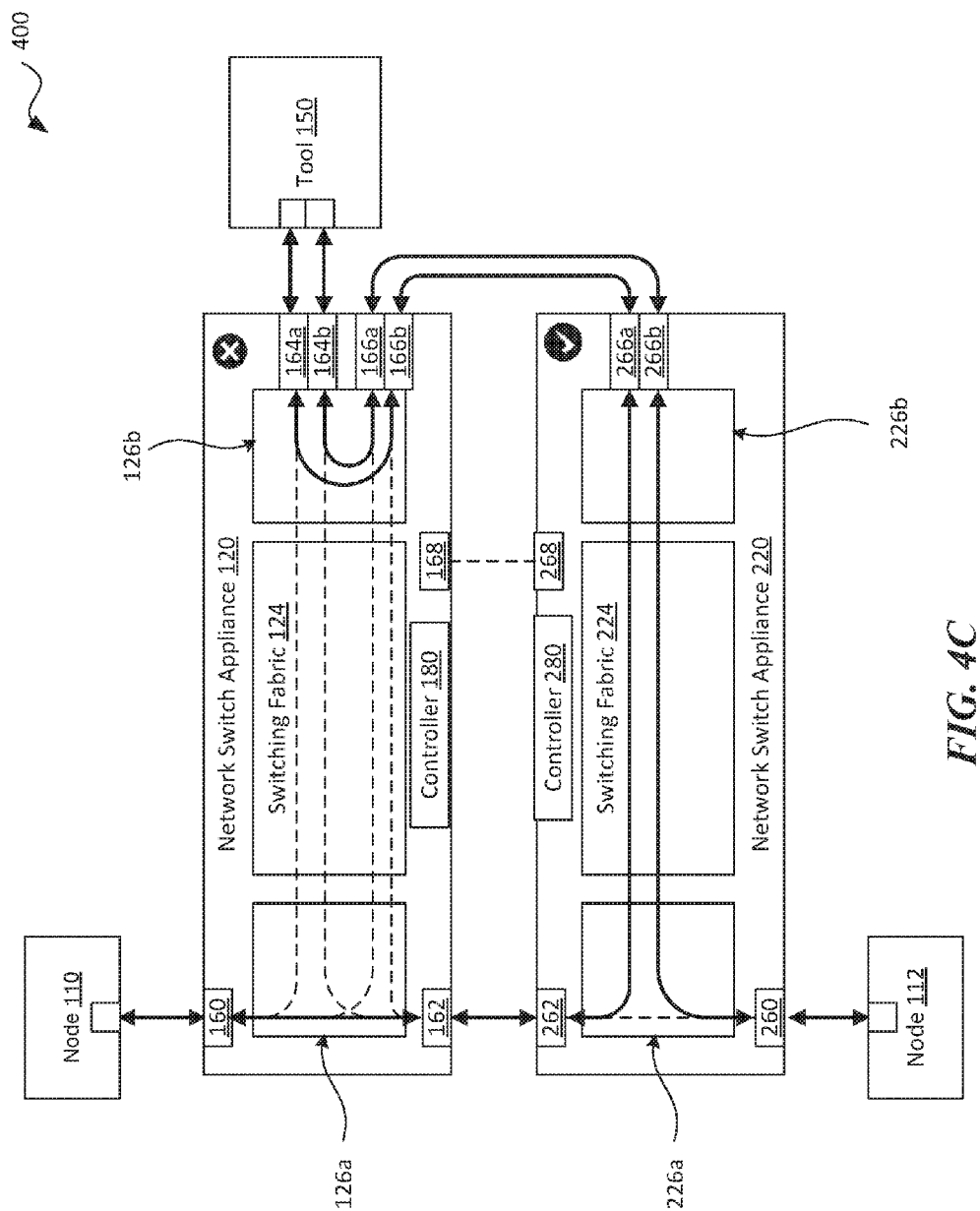
FIG. 4C illustrates the routing of packets through the system of FIG. 4A when a primary network switch appliance is in a second state.

The example network switch appliance 120 is shown in FIGS. 3A-3C as having four communication interfaces for simplicity and clarity, however in other embodiments (e.g., as shown in FIGS. 4A-4C) network switch appliance 120 can have more or fewer communication interfaces. In some embodiments, network switch appliance 120 includes a housing enclosing the components such as switching fabric 124 and bypass switch 126a-b. Bypass switch 126a-b is conceptually represented in FIGS. 3A-3C (as well as FIGS. 4A-5D) as separate modules 126a and 126b for clarity and should not be construed as limiting. Bypass switch 126a-b may be a single physical module or may comprise more than two physical modules, for example to accommodate multiple additional communications paths. As mentioned, bypass switch 126a-b may include multiple relays. Accordingly, in some embodiments, bypass switch 126a may be understood to comprise a first relay or first set of relays and bypass switch 126b may be understood to comprise a second relay or second set of relays.

Although not shown in FIGS. 3A-3C, network switch appliance 120 may have a packet processing module (also referred to herein as a "processing unit"). In various different embodiments, the packet processing module may be separate or part of the packet routing architecture, i.e. bypass switches 126a-b and switching fabric 124.

In some embodiments, network ports 160, 162, and tool ports 164a-b each include one or more physical or virtual ports. Physical ports may be built into the housing of network switch appliance 120 and be configured to detachably couple to a packet transmission medium such as twisted pair copper cabling or fiber optic cabling. In some embodiments network ports 160, 162, and tool port 164 include passive and/or active packet transmission components. For example, in FIGS. 2A-2B ports 164a-b and 166a-b are shown as discrete units separate from active components such as transceivers 140 and 142. Accordingly, in some embodiments, network switch appliance 120 may include physical layer transceiver circuitry (e.g. a Network PHY chip) (not shown) coupled to each of the respective network ports 160, 162, and tool ports 164a-b. Network PHYs may be considered to be parts of the processing module or may be considered to be components that are separate from the processing module. The PHY is configured to connect a link layer device to a physical medium such as an optical fiber, copper cable, etc. In other embodiments, instead of the PHY, the network switch appliance 120 includes an optical transceiver, or a SERDES, etc. The housing allows the network switch appliance 120 to be carried, transported, sold, and/or operated as a single unit.

The network ports 160, 162, and tool ports 164a-b are shown in FIGS. 3A-3C in simplified form for clarity and illustrative purposes. In some embodiments, network ports 160, 162, and tool ports 164*a-b* are located at a periphery of the housing of network switch appliance 120. In other embodiments, network ports 160, 162, and tool ports 164*a-b* are located at other locations relative to the housing. In some embodiments, each network port 160, 162, and tool port 164*a-b* shown in FIGS. 3A-3C represents a single physical port. In other embodiments, network ports 160, 162, and tool ports 164*a-b* shown in FIGS. 3A-3C represent virtual ports that may be combined as part of one or more physical ports. For example, network ports 160 and 162 may be part of a single physical port installed in the housing of network switch appliance 120. Similarly tool ports 164*a-b* may be part of a single physical port. Further, network ports 160, 162, and tool ports 164*a-b* may each include multiple physical ports. Further, network ports 160, 162, and tool ports 164*a-b* may be aggregates of multiple physical ports through common switch fabric arrangements known as link aggregation or trunking. For example, network port 160 in FIGS. 3A-3C can represent a group of physical ports used as a single packet transmission channel through link aggregation.

During use, the first network port 160 of the network switch appliance 120 is communicatively coupled to one or more nodes (e.g. first node 110) via a computer network, and the second network port 162 is communicatively coupled to one or more nodes (e.g. second node 112) via a computer network. The computer network may be a single network (e.g. a local area network) or may include multiple networks (e.g. the Internet). The network switch appliance 120 is configured to receive packets from and transmit packets to the nodes via network ports 160 and 162.

During use, tool ports (e.g. tool ports 164*a-b*) of the network switch appliance 120 are communicatively coupled to one or more tools (e.g. tool 150). The one or more tools 150 may be directly coupled to the network switch appliance 120 or communicatively coupled to the network switch appliance 120 through a network (e.g., the Internet). Tunneling may be applied where tools 150 are communicatively coupled to the network switch appliance 120 via a network such as the Internet. In an embodiment, network traffic transmitted between the network switch appliance 120 and a tool 150 is encapsulated into an IP tunnel envelope. The network traffic is then de-encapsulated at the tool 150. Such an arrangement may require that the tool 150 receive tunneling arrangements to facilitate de-encapsulation.

In some embodiments, tool 150 is communicatively coupled to the network switch appliance 120 via a stacking link of one or more other network switch appliances. For example, a network switch appliance 120 including a processing component may be interconnected using stacking links with one or more other physical network switch appliances. The interconnected network switch appliance 120 and one or more other network switch appliances act as single switch in such a configuration. Therefore, tool 150 may be directly connected to one or more of the other network switch appliances. In some embodiments, the network switch appliance 120 is provided as a single unit that allows the appliance 120 to be deployed at a single point along a communication path.

In some embodiments, the switching fabric 124 is configured to receive packets from a source node (e.g. node 110) via a network port (e.g. network port 160) and forward the packets to a tool (e.g. tool 150) via a tool port (e.g. tool port 164*a*). Similarly, in an in-line tool configuration, switching fabric 124 can be configured to receive packets returned from a tool (e.g. tool 150) via a tool port (e.g. tool port 164*b*) and forward those packets to a destination node (e.g. node 112) via a network port (e.g. network port 162). Further, as previously mentioned, network switch appliance 120 may include additional processing modules (not shown) that can be configured to perform additional packet processing (e.g. filtering, modification, timestamping, etc.) according to various user specified schemes.

Switching fabric 124 is configured to operate as packet switch that provides packet forwarding in accordance with a pre-determined and/or programmable forwarding schemes. In some embodiments, the switching fabric 124 may be user-configurable such that packets may be transmitted in a one-to-one configuration (i.e., from one network port to an tool port). In other embodiments, the switching fabric 124 is configured such that the packets are transmitted in a one-to-many configuration (i.e., from one network port to multiple instrument ports). In other embodiments, the switching fabric 124 is configured such that the packets are transmitted in a many-to-many configuration (i.e., from multiple network ports to multiple instrument ports). In further embodiments, the switching fabric 124 is configured such that the packets are transmitted in a many-to-one configuration (i.e., from multiple network ports to one instrument port). In some embodiments, the one-to-one, one-to-many, many-to-many, and many-to-one configurations are all available for allowing a user to selectively configure the network switch appliance 120 so that the packets (or certain types of packets) are routed according to any one of these configurations. In some embodiments, the packet movement configuration is predetermined such that when the network switch appliance 120 receives the packets, the switching fabric 124 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.). Examples of switching fabric 124 that may be used to implement features described herein can be found in currently commercially available network switch devices, such as GigaVUE™, produced by Gigamon, Inc.

In some embodiments, the packet switch implemented using switching fabric 124 may have the functionalities of a conventional packet switch except that it provides visibility into various parts of a network. Thus, embodiments of the packet switch may operate like a conventional managed packet switch, but providing packet monitoring function. This is accomplished by configuring the packet switch to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch that may be used with the network switch appliance 120 is not limited to the examples described above, and that other packet switches with different configurations may be used as well. Also, in any of the embodiments described herein, a processing unit implementing the packet switch (e.g. switching fabric 124) may include one or more integrated circuits, such as a processor (e.g., a general purpose processor, a network processor, an application-specific integrated circuit (ASIC), a field-programmable gate array (FPGA), etc.). In some embodiments, the processing unit may be a processor, such as a field processor. In other embodiments, the processing unit may be a network card. Also, in some embodiments, the processing unit may include ternary content-addressable memory (TCAM). The processing unit may be configured to perform various packet processing functions, included but not limited to packet filtering, packet routing, packet switching, packet mirroring, packet aggregation, etc.

FIG. 3B illustrates packet routing through system 300 when network switch appliance 120 is operating in a first state. As discussed, in some embodiments this first state is considered a normal operating state. Packet routing is indicated by the overlaid arrows. As shown in FIG. 3B, when network switch appliance 120 is in a first state, bypass switch 126a-b is configured to complete a communication path between a tool and a node on a computer network via the switching fabric 124. Here bypass switch 126a-b (overall analogous to bypass switch 126 in FIGS. 2A-2B) is represented conceptually in two portions, bypass switch 126a and bypass switch 126b. Again, this is done for clarity and illustrative purposes, and shall not be construed as limiting. Bypass switch 126a is communicatively coupled to network ports 160, 162, and switching fabric 124. Bypass switch 126b is communicatively coupled to tool ports 164a-b and switching fabric 124. In an embodiment, while in the first state the relays of bypass switch 126a are open and form a physical communications bridge (i.e. electrical pathway) to pass packets received via network ports 160 and 162 to switching fabric 124 and likewise to pass packets returned by switching fabric 124 to nodes 110 and 112 via network ports 160 and 162. Similarly, while in the first state the relays of switching fabric 126b are open and form a physical communications bridge (i.e. electrical pathway) to pass packets forwarded by switching fabric 124 to tool 150 via tool ports 164a-b and likewise pass packets returned by tool 150 via tool ports 164a-b to switching fabric 124 for forwarding to nodes 110 and 112 via network ports 160 and 162.

FIG. 3C illustrates packet routing through system 300 when network switch appliance 120 is operating in a second state. As discussed, in some embodiments this second state is considered a failure or power loss state. As shown in FIG. 3C, when network switch appliance 120 is in a second state, bypass switches 126a-b are configured to complete a communication path between the nodes 110 and 112, bypassing the switching component 124. In an embodiment, while in the second state the relays of bypass switch 126a are closed and form a physical communications bridge (i.e. electrical pathway) to pass packets between network ports 160 and 162, thereby bypassing switching fabric 124.

System of Redundant Network Switch Appliances

FIGS. 4A-4C illustrate the operation of an example system 400 of redundant network switch appliances 120 and 220. As shown in FIG. 4A, example system 400 includes multiple network switch appliances 120 and 220 connected in-line between communicating nodes 110 and 112 on a computer network. Network switch appliance 120 is communicatively coupled to tool 150, for example for network monitoring. In this example, network switch appliance 120 operates as a primary and network switch appliance 220 operates as a backup for packet forwarding to tool 150. Network switch appliance 120 includes network ports 160, 162, 166a-b, 168, and tool ports 164a-b, switching fabric 124, bypass switch 126a-b, and optionally a controller 180. Similarly, network switch appliance 220 includes network ports 260, 262, 266a-b, and 268, switching fabric 224, bypass switch 226a-b, and optionally a controller 280. As with bypass switch 126a-b, bypass switch 226a-b is conceptually represented in FIGS. 4A-4C (as well as FIGS. 5A-5D) as separate modules 226a and 226b for clarity and should not be construed as limiting. Bypass switch 226a-b may be a single physical module or may comprise more than two modules, for example to accommodate multiple additional communications paths. In example system 400, network switch appliance 120 and 220 can both be understood as similar or the same as network switch appliance 120 described with respect to FIGS. 3A-3C, even though more or fewer components are shown. Accordingly descriptions of the components with reference to FIGS. 3A-3C similarly apply here. For example, although network ports 166a-b and 168 are not shown in FIGS. 3A-3C, they are analogous to network ports 160 and 162, which are shown. Similarly, although network ports 260, 262 and 266a-b are not shown in FIGS. 3A-3C, they are analogous to network ports 160, 162, and 166a-b of network switch appliance 120.

Optional controllers 180 and 280 can be configured to monitor operation of network switch appliances 120 and/or 220 and control operation bypass switch 126a-b and/or 226a-b. Controllers 180 and 280 may include any integrated circuit, such as a processor (e.g., a general purpose processor, a network processor, an ASIC processor, a FPGA processor, etc.). Further, in some embodiments, controllers 180 and 280 may not be separate components, but instead may be part of one or more processing units within network switch appliances 120 or 220 (respectively), for example combined with switching fabric 124 or 224 (respectively) or bypass switch 126a-b or 226a-b (respectively).

In some embodiments, the controller 180 in the first network switch appliance 120 is configured to keep track of the states of bypass switch 126a-b and provide respective state signals that represent the respective states of the of bypass switch 126a-b. The controller 280 in network switch appliance 220 can be configured to control the bypass switch 226a-b of network switch appliance 220 based on the state signals received through the signaling link between network ports 168 and 268. Also, in some embodiments, a state signal with a single value may be used to represent both the state of a first bypass switch 126a, and the state of a second bypass component 126b. For example, in one implementation, a state signal of "1" may represent the condition when relays of both bypass switches 126a and 126b are open, a state signal of "2" may represent the condition when the relays of first bypass switch 126a are open and the relays of second bypass switch 126b are closed, a state signal of "3" may represent the condition when the relays of first bypass switch 126a are closed and the relays of second bypass switch 126b are open, and a state signal of "4" may represent the condition when the relays of first bypass switch 126a and the relays of second bypass switch 126b are closed. Accordingly, controller 280 may operate the bypass switch 226a-b in network switch appliance 220 based on the single value state signal.

As shown in FIGS. 4A-4C, network switch appliances 120 and 220 are communicatively coupled to each other via multiple interfaces. For example, between network ports 162 and 262 for in-line traffic, between network ports 166a-b and 266a-b for return traffic during bypass forwarding (to be described later), and between network ports 168 and 268 for communicating state signals. As previously described, the interfaces are shown in this simple manner for clarity. Each interface may include multiple physical or virtual ports for multichannel communication and/or may be aggregated into one or more physical or virtual ports.

FIG. 4B illustrates packet routing through system 400 when network switch appliance 120 is operating in a first state. As discussed, in some embodiments this first state is considered a normal operating state. Packet routing is indicated by the overlaid arrows. As shown in FIG. 4B, when network switch appliance 120 is in a first state, bypass switch 126a-b is configured to complete a communication path between a tool (e.g. tool 150) and a node on a computer network (e.g. node 110 or 112) via the switching fabric 124. Here bypass switch 126 is represented in two portions, bypass switch 126a and bypass switch 126b. Bypass switch 126a is communicatively coupled to network ports 160, 162, and switching fabric 124. Bypass switch 126b is communicatively coupled to network ports 166a-b, tool ports 164a-b, and switching fabric 124. In an embodiment, while in the first state the relays of bypass switch 126a are open and form a physical communications bridge (i.e. electrical pathway) to pass packets received via network ports 160 and 162 to switching fabric 124 and likewise to pass packets returned by switching fabric 124 to nodes 110 and 112 via network ports 160 and 162.

Similar to as described with respect to FIGS. 2A-2B, in some embodiments, bypass switch 126a-b is configured to automatically open or close its relays based on the state of network switch appliance 120. The state of network switch appliance 120 can be determined based on a state signal received from controller 180. For example, in some embodiments, controller 180 can output a state signal recognizable to bypass switch 126a-b. Such a controller can be configured to detect a state (or monitor the operation) of network switch appliance 120 and output a state signal to bypass switch 126a-b. For example, based on its monitoring, a controller 180 can detect a first state (e.g. normal operation) if the operation of the network switch appliance 120 satisfies a specified criterion and detect a second state (e.g. failure) if the operation of the network switch appliance does not satisfy the specified criterion. For a two state bypass switch 126, this state signal can simply be the presence or absence of a signal. Accordingly, controller 180 is not necessarily present in all embodiments as the relays of bypass switch 126a-b may be simply tied to the main power of network switch appliance 120 and open or close based on whether network switch appliance 120 is powered or not.

While primary network switch appliance 120 is in a first state, secondary network switch appliance 220 is in a "bypass state" to allow packets to pass through to and from node 112. Accordingly, while network switch appliance 120 is in a first state, the relays of bypass switch 226a are closed and form a physical communications bridge (i.e. electrical pathway) to pass received packets between network ports 260 and 262, bypassing switching fabric 224. Similar to as described above with respect to bypass switch 126a-b, in some embodiments, bypass switch 226a-b can be configured to automatically open or close its relays based on the state of network switch appliance 120. The state of network switch appliance 120 can be determined based on a state signal received from network switch appliance 120 via network port 268. For example, in some embodiments, controller 180 of switch appliance 120 can output a state signal recognizable to bypass switch 226a-b. Alternatively, a state signal output by controller 180 may be received by controller 280, interpreted, and translated used for controlling bypass switch 226a-b. For a two state bypass switch 226a-b, this state signal can simply be the presence or absence of signal. In some embodiments, the relays of bypass switch 226a-b (as well as for bypass switch 126a-b) may be simply tied to the main power of network switch appliance 120 and open or close based on whether network switch appliance 120 is powered or not.

Returning to network switch appliance 120, while in the first state the relays of switching fabric 126b are open and form a physical communications bridge (i.e. electrical pathway) to pass packets forwarded by switching fabric 124 to tool 150 via tool ports 164a-b and likewise pass packets returned by tool 150 via tool ports 164a-b to switching fabric 124 for forwarding to nodes 110 and 112 via network ports 160 and 162.

Consider an example of packets received from source node 110 and destined for destination node 112. If network switch appliance 120 is in a first state, bypass switch 126a is in a relays-open state and is therefore configured to receive packets via network port 160 and pass the packets to switching fabric 124 for forwarding to tool 150. Switching fabric 124 forwards the packets to tool 150 according to a routing scheme via bypass switch 126b. Since network switch appliance 120 is in the first state, bypass switch 126b is also in a relays-open state and is therefore configured to receive the packets from switching fabric 124 and pass them to tool port 164a for transmission to tool 150. If tool 150 is an in-line tool, the packets are returned to network switch appliance 120 via tool port 164b. Again, bypass switch 126b is in a relays-open state and is therefore configured to pass the packets back to switching fabric 124 for forwarding to node 112. Switching fabric 124 forwards the packets to node 112 according to a routing scheme via bypass switch 126a. Again, bypass switch 126a is in a relays-open state and is therefore configured to receive the packets from the switching fabric and pass them to network port 162 for transmission to node 112 via secondary network switch appliance 220. Recall that if network switch appliance 120 is in a first state, bypass switch 226a of network switch appliance 220 is in a relays-closed state and is therefore configured to pass packets received at network port 262 to network port 260 for transmission to destination node 112, bypassing the switching fabric 224 of network switch appliance 220.

FIG. 4C illustrates packet routing through system 400 when network switch appliance 120 is operating in a second state. As discussed, in some embodiments this second state is considered a failure or power loss state. As shown in FIG. 4C, when network switch appliance 120 is in a second state, bypass switch 126a-b is configured to complete a communication path between the tool 150 and nodes 110, 112 via the second network switch appliance 220, bypassing the switching component 124 of the primary network switch appliance 120. In an embodiment, while in the second state the relays of bypass switch 126a are closed and form a physical communications bridge (i.e. electrical pathway) to pass packets between network ports 160 and 162, thereby bypassing switching fabric 124. Similarly, while the second state, the relays of bypass switch 126b are closed and form a physical communications bridge (i.e. electrical pathway) to pass packets between tool ports 164a-b and network ports 166a-b, again bypassing switching fabric 124.

While primary network switch appliance 120 is in the second state, secondary network switch appliance 220 is in a "forwarding state" to handle packet forwarding to tool 150. Accordingly, while network switch appliance 120 is in the second state, the relays of bypass switch 226a are open and form a physical communications bridge (i.e. electrical pathway) to pass received packets from node 110 via interface 262 or from node 112 via network port 260 to switching fabric 224 for forwarding to tool 150 via bypass switch 226b, network port 266a or 266b, network port 166a or 166b, bypass switch 126b, and tool port 164a or 164b. Similarly, while network switch appliance 120 is in the second state, the relays of bypass switch 226b are open and form a communications bridge (i.e. electrical pathway) to pass packets between switching fabric 224 and network ports 266a-b.

Consider again the example of packets received from source node 110 and destined for destination node 112. Here, if network switch appliance 120 is in a second state, bypass switch 126a is in a relays-closed state and is therefore configured to receive packets via network port 160 and pass the packets to network port 162 for transmission to secondary network switch appliance 220, thereby bypassing switching fabric 124. Secondary network switch appliance 220 receives the packets from primary network switch appliance 120 via network port 262. While primary network switch appliance 120 is in the second state, secondary network switch appliance 220 is in a first state to handle packet forwarding to tool 150. Accordingly, bypass switch 226a is in a relays-open state and is therefore configured to pass the received packets from network port 262 to switching fabric 224 for forwarding to tool 150. Switching fabric 224 forwards the packets to network port 266a via bypass switch 226b. Since network switch appliance 120 is in the second state, bypass switch 226b is in a relays-open state and is therefore configured to receive the packets from switching fabric 224 and pass them to network port 266a for transmission to tool 150 via network switch appliance 120. Recall that secondary network switch appliance 220 is not directly coupled with tool 150. In order to forward the packets to tool 150, network switch appliance 220 transmits the packets back to network switch appliance 120 via network port 166b. If network switch appliance 120 is in the second state, bypass switch 126b is in a relays-closed state and is therefore configured to receive the packets returned from network switch appliance 220 via network port 166b and pass them to tool port 164a for transmission to tool 150. If tool 150 is an in-line tool, the packets are returned to network switch appliance 120 via tool port 164b. Again, bypass switch 126b is in a relays-closed state and is therefore configured to pass the packets back to network switch appliance 220 via network port 166a for eventual forwarding to destination node 112. Switching fabric 224 at network switch appliance 220 forwards the packets to node 112 according to a routing scheme via bypass switch 226a. Again, bypass switch 226a is in a relays-open state and is therefore configured to receive the packets from the switching fabric 224 and pass them to network port 260 for transmission to node 112.

The above described scheme for packet forwarding to tool 150 using redundant in-line network switch appliances 120 and 220 allows for near instantaneous handover of forwarding responsibilities and facilitates stateful processing of packets at tool 150. Upon a change in state at primary network switch appliance 120, the bypass switches 126a-b and 226a-b open or close their relays to change the communication path for packets through the two appliances. From the point of view of tool 150, network traffic to be processed always emerges from tool ports 164a-b, and likewise is always returned to tool ports 164a-b after processing, regardless of which appliance is actively forwarding.

Although the above example is described with reference to the node 110 being a network transmitting nodes (i.e. source node) and node 112 being a network receiving node (i.e. destination node), in other cases the node roles may be reversed and consequently the above described packet flow may be in the opposite direction.

Symmetrical System of Redundant Network Switch Appliances

Figure 5A:
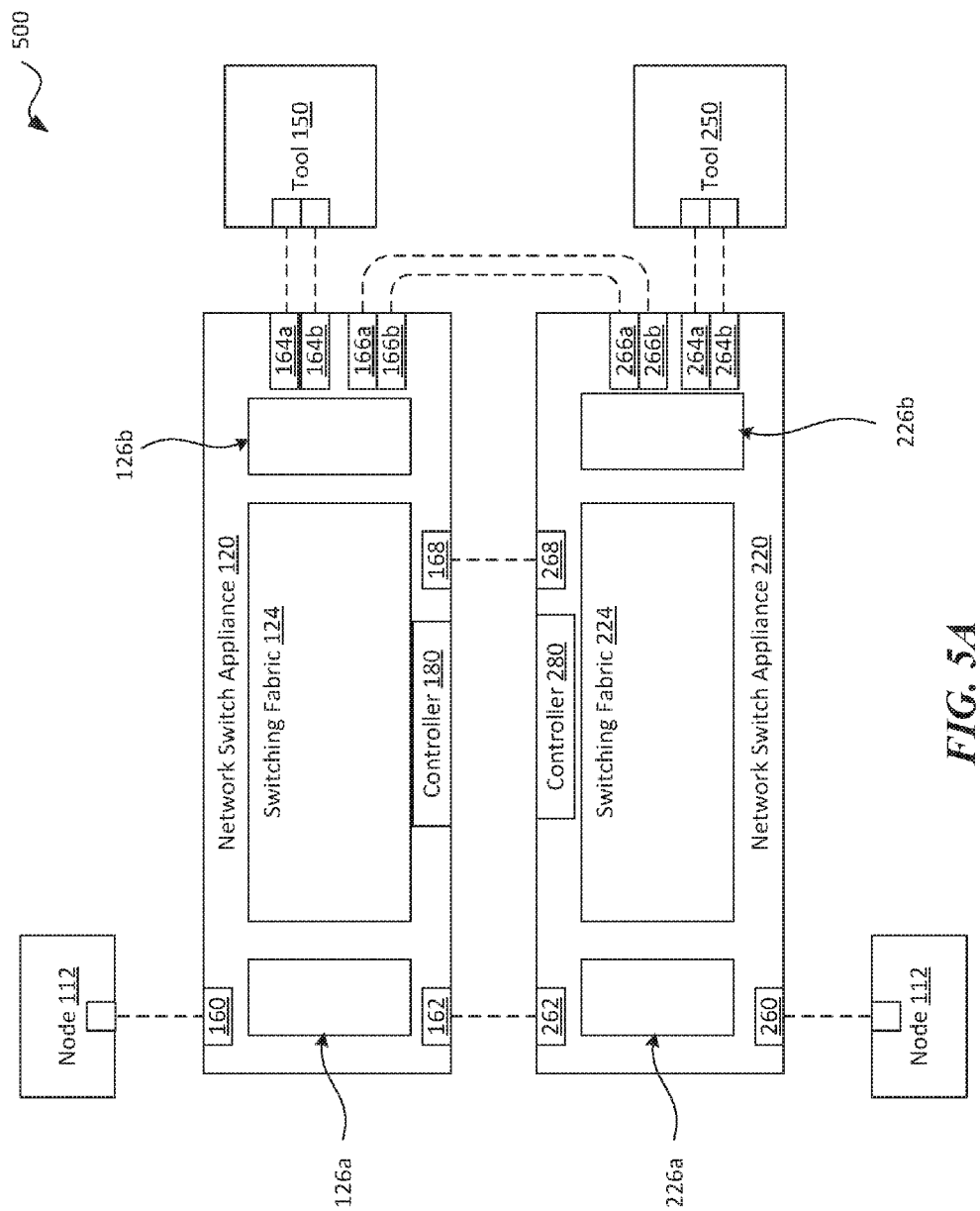
FIG. 5A shows an example symmetrical system of redundant in-line network switch appliances with bypass switches.
Figure 5B:
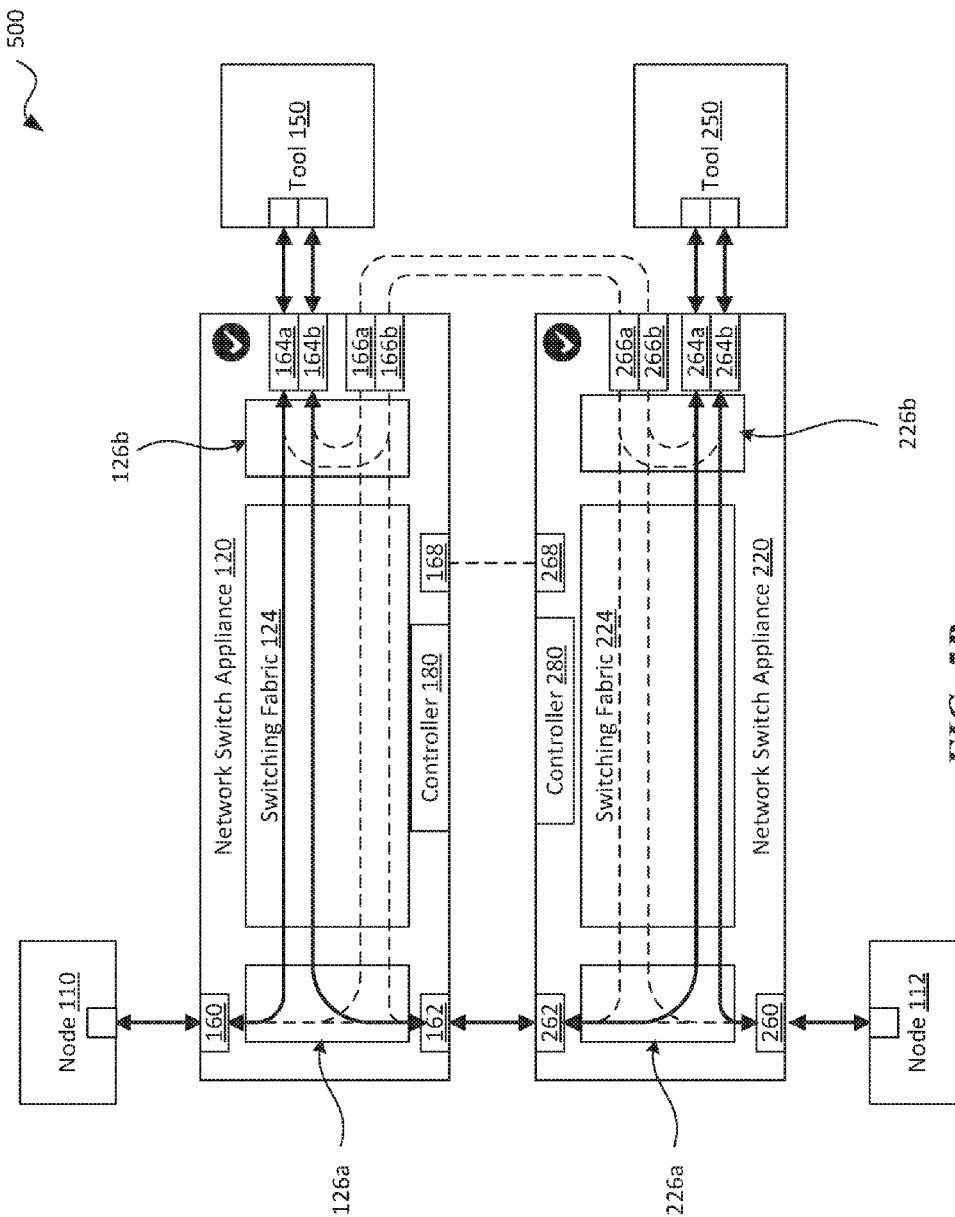
FIG. 5B illustrates the routing of packets through the system of FIG. 5A when both a first and second network switch appliance of the system are in a first state.
Figure 5C:
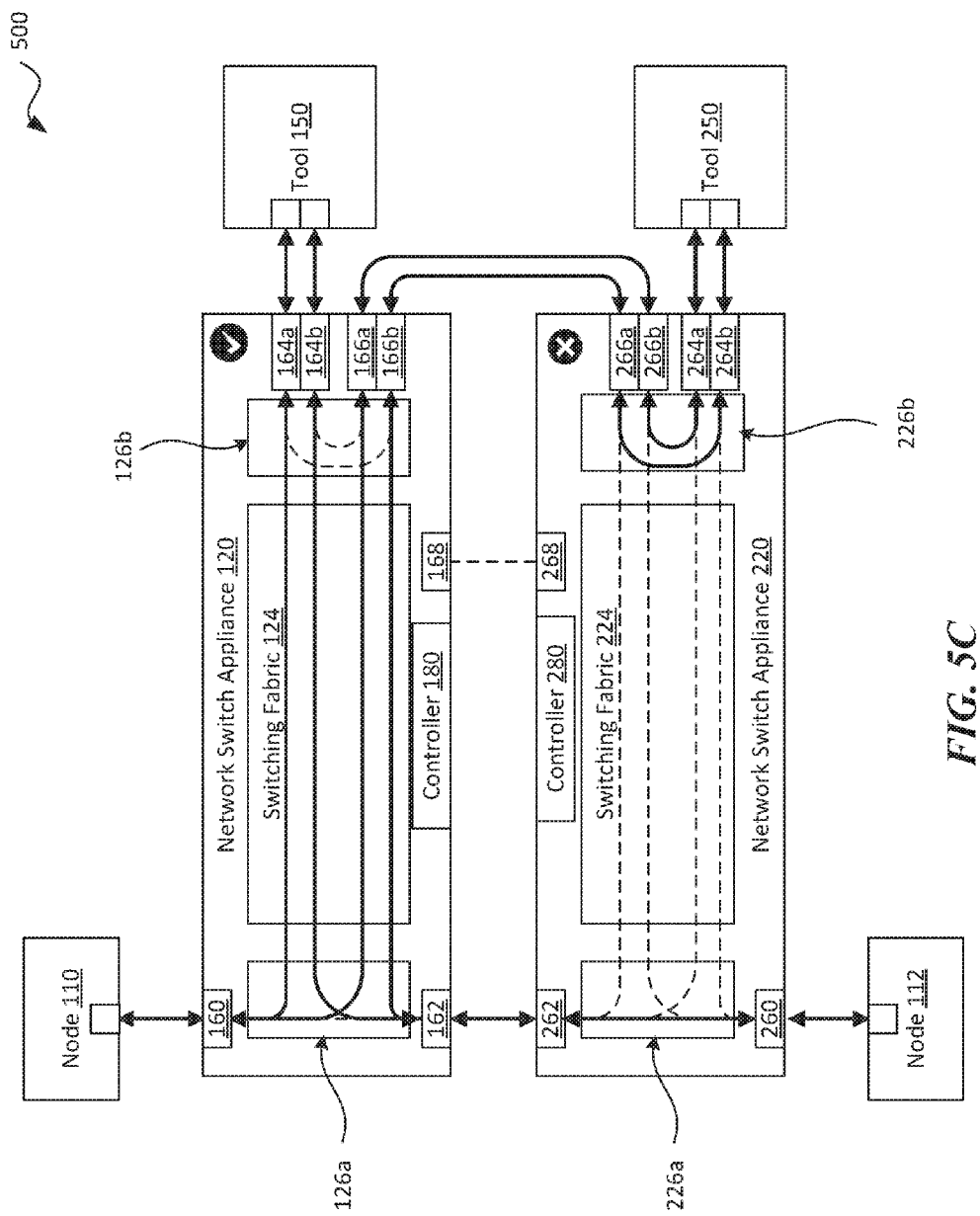
FIG. 5C illustrates the routing of packets through the system of FIG. 5A when the first network switch appliance of the system is in a first state and the second network switch appliance of the system is in a second state.

FIGS. 5A-5C illustrate the operation of an example symmetrical system 500 of redundant network switch appliances 120 and 220. System 500 is similar to system 400 except that a tool 250 is communicatively coupled to network switch appliance 220. System 500 is symmetrical because both appliances 120 and 220 can operate as the primary for forwarding to their respectively connected tool and, likewise can act as a secondary for forwarding to the tool connected to another device. As shown in FIG. 5A, example system 500 includes multiple network switch appliances 120 and 220 connected in-line between communicating nodes 110 and 112 on a computer network. Here network switch appliance 120 is communicatively coupled to tool 150, for example for network monitoring. Similarly, network switch appliance 220 is communicatively coupled to tool 250, for example for network monitoring. In this example, network switch appliance 120 operates as a primary and network switch appliance 220 operates as a backup for packet forwarding to tool 150. Conversely, network switch appliance 220 can act as a primary and network switch appliance 120 can act as a backup for forwarding to tool 250. Network switch appliance 120 includes network ports 160, 162, 166a-b, 168, tool ports 164a-b, switching fabric 124, bypass switch 126a-b, and optionally a controller 180. Similarly, network switch appliance 220 includes network ports 260, 262, 266a-b, 268, tool ports 264a-b, switching fabric 224, bypass switch 226a-b, and optionally a controller 280. In example system 500, network switch appliance 120 and 220 can both be understood as similar or the same as network switch appliances 120 and 220 described with respect to system 400 in FIGS. 4A-4C, even though more or fewer components are shown. Accordingly descriptions of the components with reference to FIGS. 4A-4C similarly apply here. For example, although tool ports 264a-b are not shown in FIGS. 4A-4C, they are analogous to tool ports 164a-b of network switch appliance 120.

FIG. 5B illustrates packet routing through system 500 when both network switch appliances 120 and 220 are operating in a first state. As discussed, in some embodiments this first state is considered a normal operating state. Packet routing is indicated by the overlaid arrows. As shown in FIG. 5B, when network switch appliance 120 is in a first state, bypass switches 126a-b are configured to complete a communication path between tool 150 and a node on a computer network (e.g. node 110 or 112) via the switching fabric 124. In other words, network switch appliance 120 is acting as the primary for forwarding to tool 150. Here, bypass switch 126 is represented in two portions, bypass switch 126a and bypass switch 126b. Bypass switch 126a is communicatively coupled to network ports 160, 162, and switching fabric 124. Bypass switch 126b is communicatively coupled to tool ports 164a-b, network ports 166a-b, and switching fabric 124. In an embodiment, while network switch appliance 120 is in the first state the relays of bypass switch 126a are open and form a physical communications bridge (i.e. electrical pathway) to pass packets received via network ports 160 and 162 to switching fabric 124 and likewise to pass packets returned by switching fabric 124 to nodes 110 and 112 via network ports 160 and 162.

Similarly, as shown in FIG. 5B, when network switch appliance 220 is in a first state, bypass switch 226a-b are configured to complete a communication path between tool 250 and a node on a computer network (e.g. node 110 or 112) via the switching fabric 224. In other words, network switch appliance 220 is acting as the primary for forwarding to tool 250. Here, bypass switch 226 is represented in two portions, bypass switch 226a and bypass switch 226b. Bypass switch 226a is communicatively coupled to network ports 260, 262, and switching fabric 224. Bypass switch 226b is communicatively coupled to tool ports 264a-b, network ports 266a-b, and switching fabric 224. In an embodiment, while network switch appliance 220 is in the first state, the relays of bypass switch 126a are open and form a physical communications bridge (i.e. electrical pathway) to pass packets received via network ports 160 and 162 to switching fabric 124 and likewise to pass packets returned by switching fabric 124 to nodes 110 and 112 via network ports 160 and 162.

Consider an example of packets received from source node 110 and destined for destination node 112. If network switch appliance 120 is in a first state, bypass switch 126a is in a relays-open state and is therefore configured to receive packets via network port 160 and pass the packets to switching fabric 124 for forwarding to tool 150. Switching fabric 124 forwards the packets to tool 150 according to a routing scheme via bypass switch 126b. Since network switch appliance 120 is in the first state, bypass switch 126b is also in a relays-open state and is therefore configured to receive the packets from switching fabric 124 and pass them to tool port 164a or 164b for transmission to tool 150. If tool 150 is an in-line tool, the packets are returned to network switch appliance 120 via tool port 164a or 164b. Again, bypass switch 126b is in a relays-open state and is therefore configured to pass the packets back to switching fabric 124 for forwarding to node 112 via network switch appliance 220. Switching fabric 124 forwards the packets according to a routing scheme via bypass switch 126a. Again, bypass switch 126a is in a relays-open state and is therefore configured to receive the packets from the switching fabric and pass them to network port 162 for transmission to secondary network switch appliance 220 via network port 262. Although network switch appliance 220 serves as a backup to appliance 120 for forwarding to tool 150, it is a primary for forwarding to tool 250, therefore appliance 220 is not necessarily in a bypass state. If network switch appliance 220 is in a first state (e.g. normal operation), bypass switch 226a is in a relays-open state and is therefore configured to receive packets via network port 262 and pass the packets to switching fabric 224 for forwarding to tool 250. Switching fabric 224 forwards the packets to tool 250 according to a routing scheme via bypass switch 226b. Since network switch appliance 220 is in the first state, bypass switch 226b is also in a relays-open state and is therefore configured to receive the packets from switching fabric 224 and pass them to tool port 264a or 264b for transmission to tool 250. If tool 250 is an in-line tool, the packets are returned to network switch appliance 220 via tool port 264a or 264b. Again, bypass switch 226b is in a relays-open state and is therefore configured to pass the packets back to switching fabric 224 for forwarding to node 112 via bypass switch 226a and network port 260. Switching fabric 224 forwards the packets according to a routing scheme via bypass switch 226a. Again, bypass switch 226a is in a relays-open state and is therefore configured to receive the packets from the switching fabric 224 and pass them to network port 260 for transmission to node 112.

In some embodiments, all packet traffic is to both tools 150 and 250 according to routes shown in FIG. 5B. However, in other embodiments, system 500 can be configured to selectively route traffic to either tools 150 or 250. For example, packets arriving at network switch appliance 120 via network port 160 can be selectively routed to either tool 150 or tool 250 based on predetermined and/or dynamic packet matching criteria applied by switching fabric 124. For example, received packets can be assigned a priority level based on packet matching criteria with packets having a higher priority routed to tool 150 and packets having a lower priority routed to tool 250. If a received packet satisfies a particular packet matching criteria, switching fabric 124 may be configured to forward the packet to tool 150 via bypass switch 126b and tool port 164a or 164b. Alternatively, if the received packet does not satisfy the particular packet matching criteria, switching fabric may forward the packet back to network port 162 via bypass switch 126a for transmission to tool 250 via network switch appliance 220. Similar selective routing based on packet matching criteria may be applied by switching fabric 224 at network switch appliance 220.

FIG. 5C illustrates packet routing through system 500 when network switch appliance 120 is operating in a first state (e.g. a normal operating state) and network switch appliance 220 is operating in a second state (e.g. a failure state). Packet routing is indicated by the overlaid arrows. As shown in FIG. 5C, when network switch appliance 120 is in a first state, bypass switch 126a-b are configured to complete a communication path between tool 150 and a node on a computer network (e.g. node 110 or 112) via the switching fabric 124. Also as shown in FIG. 5C, if forwarding to secondary tool 250 is desired, bypass switch 126a-b can also be configured to complete a communication path between tool 250 and a node on a computer network (e.g. node 110 or 112) via the switching fabric 124 and secondary network switch appliance 220. Here bypass switch 126a-b is represented in two portions, bypass switch 126a and bypass switch 126b. Bypass switch 126a is communicatively coupled to network ports 160, 162, and switching fabric 124. Bypass switch 126b is communicatively coupled to tool ports 164a-b, network ports 166a-b, and switching fabric 124. In an embodiment, while in the first state the relays of bypass switch 126a are open and form a physical communications bridge (i.e. electrical pathway) to pass packets received via network ports 160 and 162 to switching fabric 124 and likewise to pass packets returned by switching fabric 124 to nodes 110 and 112 via network ports 160 and 162.

While primary network switch appliance 120 is in a first state, secondary network switch appliance 220 is in a second or "bypass" state to allow packets to pass through to and from node 112 and to and from tool 250. Accordingly, while network switch appliance 220 is in a second state, the relays of bypass switch 226a are closed and form a physical communications bridge (i.e. electrical pathway) to pass packets between network ports 260 and 262, bypassing switching fabric 224.

Returning to network switch appliance 120, while in the first state the relays of switching fabric 126b are open and form a physical communications bridge (i.e. electrical pathway) to pass packets forwarded by switching fabric 124 to tools 150 via tool port 164a or 164b and to tool 250 via network port 166a or 164b and likewise to pass packets returned by tool 150 via tool port 164a or 164b and returned by tool 250 via network port 166a or 166b to switching fabric 124 for forwarding to nodes 110 and 112 via network ports 160 and 162.

Consider an example of packets received from source node 110 and destined for destination node 112. If network switch appliance 120 is in a first state, bypass switch 126a is in a relays-open state and is therefore configured to receive packets via network port 160 and pass the packets to switching fabric 124 for forwarding to tool 150 and/or tool 250. Note that both routes are shown in FIG. 5B; however switching fabric can be configured to route packets to one port but not the other if processing is only needed at one tool. Alternatively, switching fabric 124 (or some other processing component of appliance 120) can selectively route some packets to tool 150 via tool port 164a and some packets to tool 250 via network port 166a based on predefined or dynamic packet matching criteria. For example, received packets can be assigned a priority level based on packet matching criteria with packets having a higher priority routed to tool 150 and packets having a lower priority routed to tool 250. Switching fabric 124 forwards the packets to tool 150 and/or 250 according to a routing scheme via bypass switch 126*b*. Since network switch appliance 120 is in the first state, bypass switch 126*b* is also in a relays-open state and is therefore configured to receive the packets from switching fabric 124 and pass them to tool port 164*a* and/or network port 166*a* for transmission to tool 150 and/or tool 250. If tool 150 and/or 250 is an in-line tool, the packets are returned to network switch appliance 120 via tool port 164*b* and/or network port 166*b* (respectively). Again, bypass switch 126*b* is in a relays-open state and is therefore configured to pass the packets back to switching fabric 124 for forwarding to node 112. Switching fabric 124 forwards the packets to node 112 according to a routing scheme via bypass switch 126*a*. Again, bypass switch 126*a* is in a relays-open state and is therefore configured to receive the packets from the switching fabric and pass them to network port 162 for transmission to node 112 via secondary network switch appliance 220. Recall that if network switch appliance 220 is in a second state, bypass switch 226*a* of network switch appliance 220 is in a relays-closed state and is therefore configured to pass packets received at network port 262 to network port 260 for transmission to destination node 112, bypassing the switching fabric 224 of network switch appliance 220. Also, if network switch appliance 220 is in the second state, bypass switch 226*b* of network switch appliance 220 is in a relays-closed state and is therefore configured to receive packets from network switch appliance 120 via network port 266*b* and pass them to tool port 264*a* for transmission to tool 250, as shown in FIG. 5C. Likewise, if tool 250 is an in-line tool, bypass switch 226*b* is configured (in the relays-closed state) to receive returned packets from tool 250 via tool port 264*b* and pass them to network switch appliance 120 via network port 266*a*.

Figure 5D:
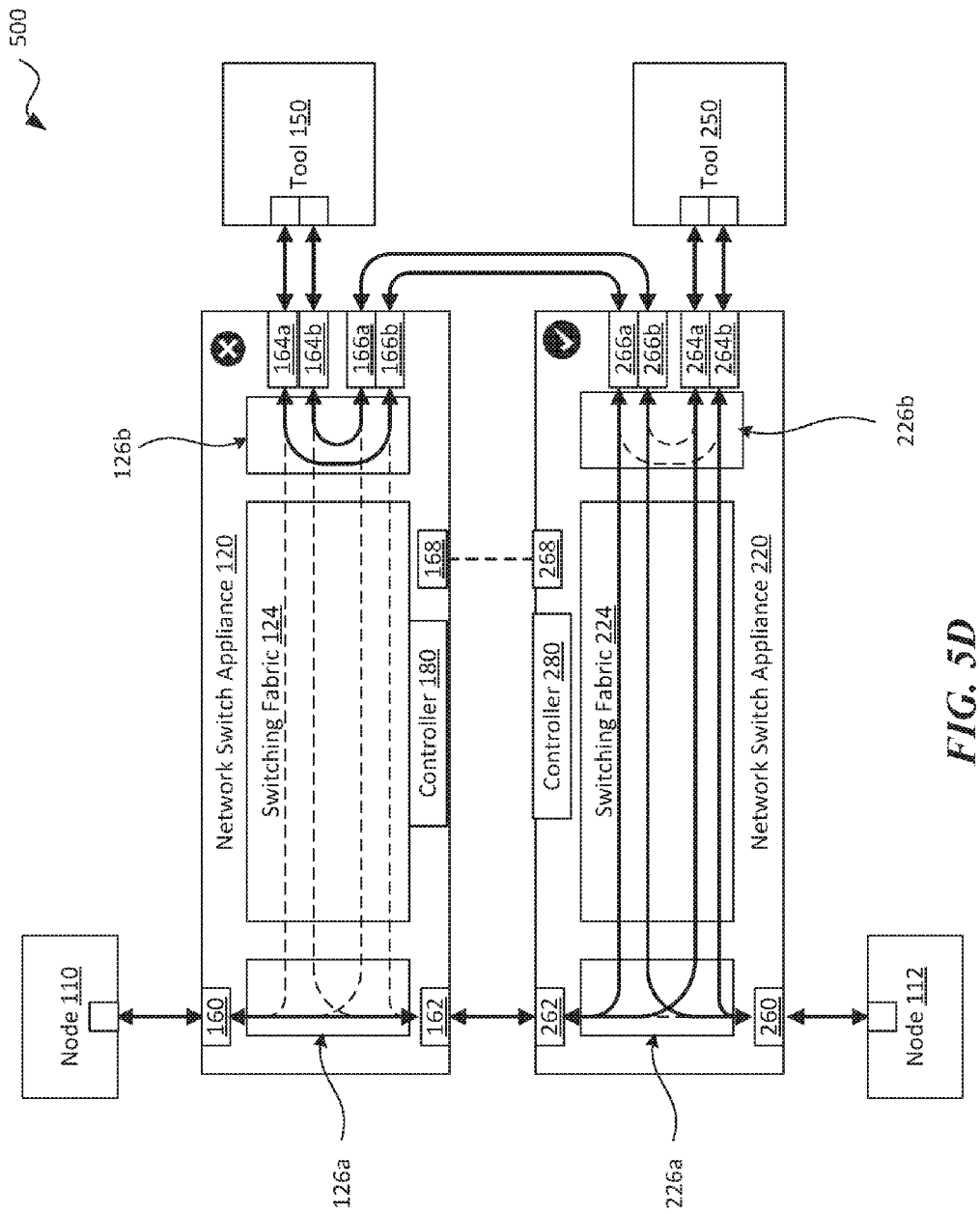
FIG. 5D illustrates the routing of packets through the system of FIG. 5A when the first network switch appliance of the system is in a second state and the second network switch appliance of the system is in a first state.

FIG. 5D illustrates packet routing through system 500 when network switch appliance 120 is operating in a second state (e.g. a failure state) and network switch appliance 220 is operating in a first state (e.g. a normal operating state). Packet routing is indicated by the overlaid arrows. As shown in FIG. 5D, when network switch appliance 120 is in a second state, bypass switches 126*a-b* are configured to complete a communication path between tool 150 and a node (e.g. node 110 or 112) on the computer network via a second network switch appliance 220, bypassing the switching fabric 124. Also as shown in FIG. 5D, if forwarding to secondary tool 250 is desired, bypass switch 126*a-b* can also be configured to complete a communication path between tool 250 and a node on a computer network (e.g. node 110 or 112) via the switching fabric 224 at secondary network switch appliance 220, again bypassing switching fabric 124. Here, bypass switch 126 is represented in two portions, bypass switch 126*a* and bypass switch 126*b*. Bypass switch 126*a* is communicatively coupled to network ports 160, 162, and switching fabric 124. Bypass switch 126*b* is communicatively coupled to tool ports 164*a-b*, network ports 166*a-b*, and switching fabric 124. In an embodiment, while network switch appliance 120 is in a second state, the relays of bypass switch 126*a* are closed and form a physical communications bridge (i.e. electrical pathway) to pass packets between network ports 160 and 162, bypassing switching fabric 124.

While primary network switch appliance 120 is in a second state, secondary network switch appliance 220 is in a first or "forwarding" state to handle forwarding of packets to tools 150 and/or 250. Accordingly, if network switch appliance 220 is in a first state, the relays of bypass switch 226*a* are open and form a physical communications bridge (i.e. electrical pathway) to pass packets received via network ports 260 and 262 to switching fabric 224 and likewise to pass packets returned by switching fabric 224 to nodes 110 and 112 via network ports 260 and 262. Further, if network switch appliance 220 is in the first state, the relays of bypass switch 226*b* are open and form a physical communications bridge (i.e. electrical pathway) to pass packets forwarded by switching fabric 224 to tools 150 and/or 250 via network ports 266*a-b* and tool ports 264*a-b* (respectively) and likewise to pass packets returned by tool 150 via network port 266*a* or 266*b* and returned by tool 250 via tool port 264*a* or 264*b* to switching fabric 124 for forwarding to nodes 110 and 112 via network ports 260 and 262.

Consider an example of packets received from source node 110 at network port 160 and destined for destination node 112. If network switch appliance 120 is in a second state, bypass switch 126*a* is in a relays-closed state and is therefore configured to pass the packets network switch appliance 220 via network port 162, bypassing switching fabric 124. If network switch appliance 220 is in a first state, bypass switch 226*a* is in a relays-open state and is therefore configured to receive packets via network port 262 and pass the packets to switching fabric 224 for forwarding to tool 150 and/or tool 250. Note that that both routes are shown in FIG. 5D; however switching fabric 224 can be configured to route packets to one port but not the other if processing is only needed at one tool. Alternatively, switching fabric 224 (or some other processing component of appliance 120) can selectively route some packets to tool 150 via network port 266*a* and some packets to tool 250 via tool port 264*a* based on predefined or dynamic packet matching criteria. For example, received packets can be assigned a priority level based on packet matching criteria with packets having a higher priority routed to tool 150 and packets having a lower priority routed to tool 250. Switching fabric 224 forwards the packets to tool 150 and/or 250 according to a routing scheme via bypass switch 226*b*. Since network switch appliance 220 is in the first state, bypass switch 226*b* is in a relays-open state and is therefore configured to receive the packets from switching fabric 224 and pass them to network port 266*a* and/or tool port 264*a* for transmission to tool 150 and/or tool 250 (respectively). If tool 150 and/or 250 is an in-line tool, the packets are returned to network switch appliance 220 via tool port 264*b* and/or network port 266*b*. Again, bypass switch 226*b* is in a relays-open state and is therefore configured to pass the packets back to switching fabric 224 for forwarding to node 112. Switching fabric 224 forwards the packets to node 112 according to a routing scheme via bypass switch 226*a*. Again, bypass switch 226*a* is in a relays-open state and is therefore configured to receive the packets from the switching fabric 224 and pass them to network port 260 for transmission to node 112. Recall that if network switch appliance 120 is in a second state, bypass switch 126*b* of network switch appliance 120 is in a relays-closed state and is therefore configured to pass packets received from network switch appliance 220 at network port 166*b* to tool port 164*a* for transmission to tool 150, as shown in FIG. 5D. Likewise, if tool 150 is an in-line tool, bypass switch 126*b* (in the relays-closed state) is configured to receive returned packets from tool 150 via tool port 164*b* and pass them to network switch appliance 120 via network port 166*a*.

Although the above example is described with reference to the node 110 being a network transmitting nodes (i.e. source node) and node 112 being a network receiving node (i.e. destination node), in other cases the node roles may be reversed and consequently the above described packet flow may be reversed in the opposite direction.

Example system 500 described in FIGS. 5A to 5D includes two network switch appliances 120 and 220, both with one tool communicatively coupled to each. However, a system of redundant in-line network switch appliances may include more than two such appliances. Similarly, each appliance may be communicatively coupled to more than one tool. For example, an additional network switch appliance with an associated additional tool may be connected in line with network switch appliances 120 and 220 of example system 500 to form a system of three redundant in-line network switch appliances. Following the teachings of the present disclosure, the number of redundant in-line network switch appliances and connected tools is limited only by the available communications interfaces at each appliance.

Arrangements of the tools (e.g. tools 150 and 250) are not limited to the examples described above, and there are many possible arrangements of sets of inline tools and non-pass through tools communicatively coupled to the network switch appliances. For example, in an embodiment, an additional tool may be communicatively coupled to both network switch appliance 120 and network switch appliance 220 via separate communication links. The redundant arrangement of network switch appliances described herein applies to any configuration of connected tools because the innovations described herein deal with deciding whether the traffic on a particular appliance is guided through the inline tools attached to the appliance or bypassed.

Also, in some embodiments, the set of one or more tools communicatively coupled to a first network switch appliance 120 may have the same configuration (e.g., perform one or more functions that are the same) as the set of one or more tools communicatively coupled to the second network switch appliance 220. In other embodiments, the set of one or more tools communicatively coupled to the first network switch appliance 120 may have a different configuration (e.g., perform one or more functions that are the different) as the set of one or more inline tools communicatively coupled to the second network switch appliance 220.

In some embodiments, one or more tools may be communicatively coupled to a network switch appliance in series. For example, tool 150 as shown in FIG. 3A-3C, 4A-4C, or 5A-5D may represent more than one tool communicatively coupled in series to processed packets according to a particular sequence. In other embodiments, tool 150 may represent more than one tool communicatively coupled to network switch appliance via multiple ports (i.e. tool port 164*a*-*b* would represent these multiple ports) and switching fabric 124 may be configured to route packets through the more than one tool according to a predefined or dynamically defined sequence of tools via tool port 164*a*-*b*.

Example Deployment in a Network Environment

Figure 6:
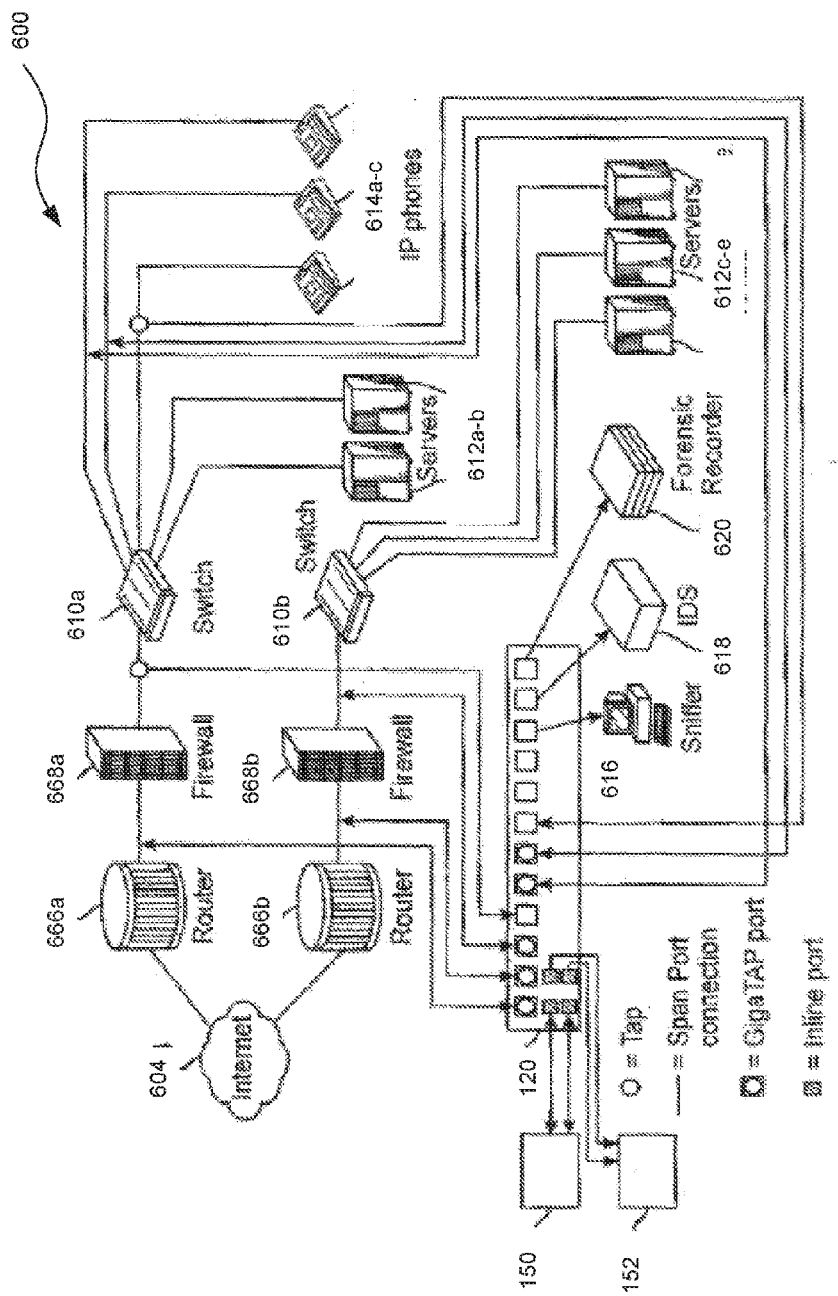
FIG. 6 shows an example deployment of a network switch appliance in a network environment.

FIG. 6 shows the deployment of a network switch appliance (e.g. network switch appliance 120) in a network environment 600 in accordance with some embodiments. The Internet 604 is coupled via routers 666*a*-*b* and firewalls 668*a*-*b* to two switches 610*a* and 610*b*. Switch 610*a* is coupled to servers 612*a*-*b* and IP phones 614*a*-*c*. Switch 610*b* is coupled to servers 612*c*-*e*. A sniffer 616, an IDS 618 and a forensic recorder 620 (collectively, "non-pass through instruments") are coupled to the network switch appliance 120. As illustrated in FIG. 6, there is a reduction on the number of non-pass through instruments in this deployment as compared to a conventional configuration (in which there may be one or more non-pass through instruments between router 666*a* and firewall 668*a*, one or more non-pass through instruments between firewall 668*a* and switch 610*a*, one or more non-pass through instruments between router 666*b* and firewall 668*b*, and firewall 668*b* and switch 610*b*) because the same non-pass through instruments can now access information anywhere in the network environment 600 through the appliance 120. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 614*a*-*c* can be easily configured to be sent to an IDS 618. It is also possible that traffic inside a particular IP phone 614*a*-*c* connection can be sent to a sniffer 616, IDS 618 and a forensic recorder 620 simultaneously via the one-to-many function.

In some embodiments, when using the appliance 120, one or more non-pass through instruments (such as IDS, sniffer, forensic recorder, etc.) may be connected to instrument port(s), and one or more pass through instruments 150, 152 (e.g., IPS) may be connected to other instrument port(s) (e.g., in-line port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then passes the packets downstream towards the intended recipient node). In some cases, by having both an IDS and an IPS connected to the appliance 120, the appliance 120 can compare whether the IDS or the IPS sees more threats, and/or can have a redundant protection such that if the IPS misses any threat, the IDS may pick it up.

Example Computer System Architecture

Figure 7:
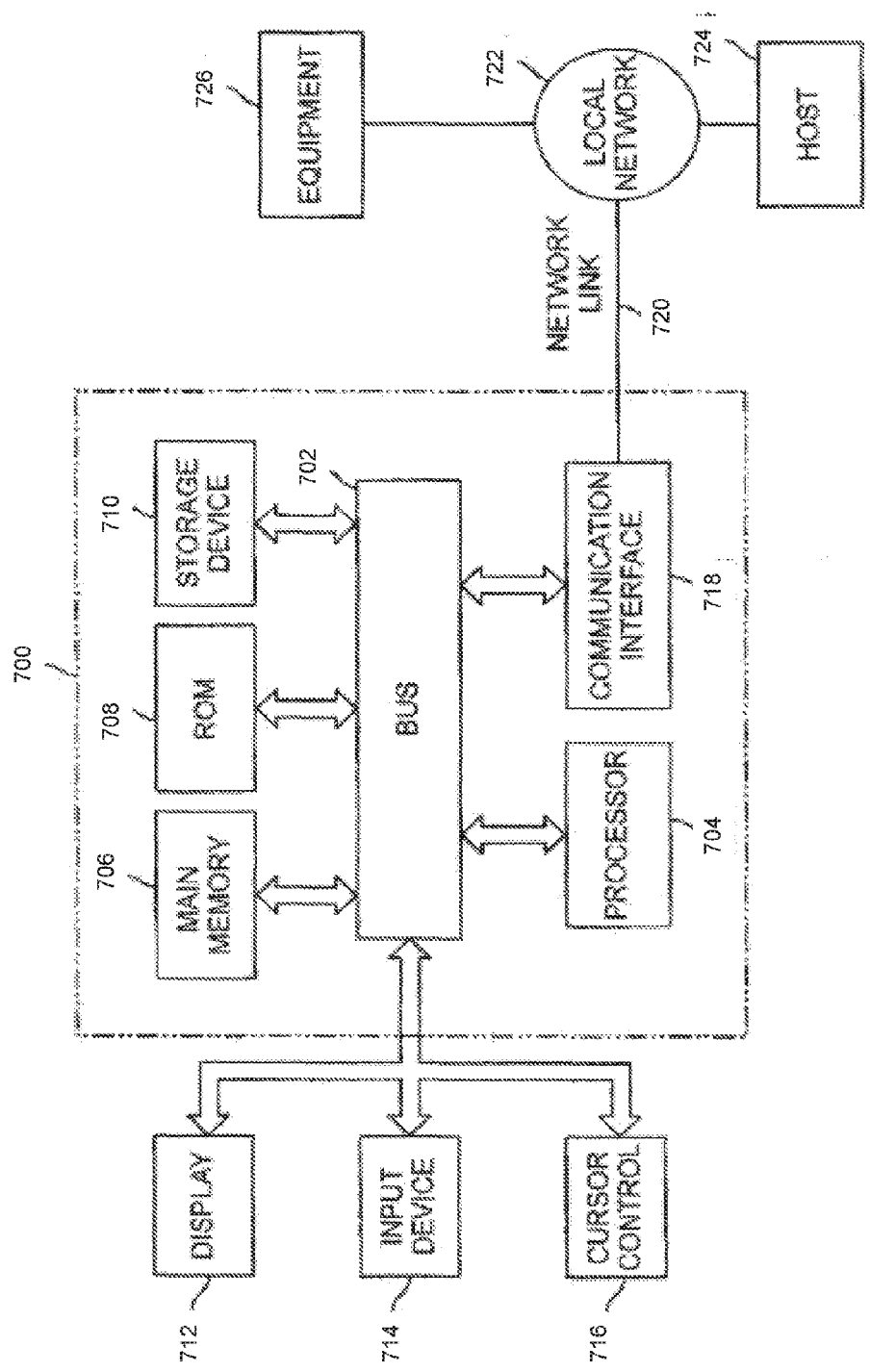
FIG. 7 shows a block diagram that illustrates an embodiment of an example computer system upon which embodiments described herein may be implemented.

FIG. 7 is a block diagram that illustrates an embodiment of a computer system 700 in which embodiments described herein may be implemented. Computer system 700 includes a bus 702 or other communication mechanism for communicating information, and a processor 704 coupled with the bus 702 for processing information. The processor 704 may be used to perform various functions described herein. For example, in some embodiments, the processor 704 may receive input from a user for configuring a network component (e.g., the network switch appliance 120).

The computer system 700 also includes a main memory 706, such as a random access memory (RAM) or other dynamic storage device, coupled to the bus 702 for storing information and instructions to be executed by the processor 704. The main memory 706 also may be used for storing temporary variables or other intermediate information during execution of instructions to be executed by the processor 704. The computer system 700 further includes a read only memory (ROM) 708 or other static storage device coupled to the bus 702 for storing static information and instructions for the processor 704. A data storage device 710, such as a magnetic disk or optical disk, is provided and coupled to the bus 702 for storing information and instructions.

The computer system 700 may be coupled via the bus 702 to a display 712, such as a liquid crystal display (LCD) or light emitting diode (LED) display, for displaying information to a user. An input device 714, including alphanumeric and other keys, is coupled to the bus 702 for communicating information and command selections to processor 704. Another type of user input device is cursor control 716, such as a mouse, a trackball, touch screen display, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The computer system 700 may be used for performing various functions in accordance with the embodiments described herein. According to one embodiment, such use is provided by computer system 700 in response to processor 704 executing one or more sequences of one or more instructions contained in the main memory 706. Such instructions may be read into the main memory 706 from another computer-readable medium, such as storage device 710. Execution of the sequences of instructions contained in the main memory 706 causes the processor 704 to perform the process steps described herein. One or more processors in a multi-processing arrangement may also be employed to execute the sequences of instructions contained in the main memory 706. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 704 for execution. Such a medium may take many forms, including but not limited to, non-volatile media, volatile media, and transmission media. Non-volatile media includes, for example, optical or magnetic disks, such as the storage device 710. A non-volatile medium may be considered to be an example of a non-transitory medium. Volatile media includes dynamic memory, such as the main memory 706. A volatile medium may be considered to be another example of a non-transitory medium. Transmission media includes coaxial cables, copper wire and fiber optics, including the wires that comprise the bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 704 for execution. For example, the instructions may initially be carried on a magnetic disk of a remote computer. The remote computer can load the instructions into its dynamic memory and send the instructions over a telephone line using a modem. A modem local to the computer system 700 can receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 706, from which the processor 704 retrieves and executes the instructions. The instructions received by the main memory 706 may optionally be stored on the storage device 710 either before or after execution by the processor 704.

The computer system 700 also includes a communication interface 718 coupled to the bus 702. The communication interface 718 can include one or more ports to couple computer system 700 with one or more other devices over one or more point-to-point links, local area networks (LANs), wide area networks (WANs), the global Internet, virtual private networks (VPNs) implemented over a public network, or the like. For example, as shown in FIG. 7, communication interface 718 provides a two-way data communication coupling to a network link 720 that is connected to a local network 722. For example, the communication interface 718 may be an integrated services digital network (ISDN) card or a modem to provide a data communication connection to a corresponding type of telephone line. As another example, the communication interface 718 may be a local area network (LAN) card to provide a data communication connection to a compatible LAN. Wireless links may also be implemented. In any such implementation, the communication interface 718 sends and receives electrical, electromagnetic or optical signals that carry data streams representing various types of information.

The network link 720 typically provides data communication through one or more networks to other devices. For example, the network link 720 may provide a connection through local network 722 to a host computer 724 or to equipment 726 such as a radiation beam source or a switch operatively coupled to a radiation beam source. The data streams transported over the network link 720 can comprise electrical, electromagnetic or optical signals. The signals through the various networks and the signals on the network link 720 and through the communication interface 718, which carry data to and from the computer system 700, are exemplary forms of carrier waves transporting the information. The computer system 700 can send messages and receive data, including program code, through the network(s), the network link 720, and the communication interface 718.

Although particular embodiments have been shown and described, they are not intended to limit the invention except as recited in the appended claims. Changes and modifications may be made without departing from the spirit and scope of the claimed invention. The specification and drawings are, accordingly, to be regarded in an illustrative rather than restrictive sense. The claimed invention covers alternatives, modifications, and equivalents, as defined by the claims.

What is claimed is:

1. A network switch appliance comprising:
 a switching fabric; and
 a bypass switch communicatively coupled to the switching fabric;
 wherein the network switch appliance has a first state and a second state; and
 wherein the bypass switch is configured to:
  when the network switch appliance is in the first state, complete a communication path between a tool and a node on a computer network via the switching fabric; and
  when the network switch appliance is in the second state, complete a communication path between the tool and the node on the computer network via a second network switch appliance, bypassing the switching fabric;

the tool, node, and the second network switch appliance each being external to the network switch appliance.

2. The network switch appliance of claim 1, wherein the network switch appliance is in the first state when operating normally and is the second state when a failure occurs.

3. The network switch appliance of claim 1, wherein the network switch appliance is the first state when powered and is in the second state when unpowered.

4. The network switch appliance of claim 1, further comprising:
   a first network port configured to be communicatively coupled with the node on the computer network;
   a second network port and a third network port configured to be communicatively coupled with the second network switch appliance; and
   a tool port configured to be communicatively coupled with the tool.

5. The network switch appliance of claim 4, wherein the bypass switch is configured to:
   when the network switch appliance is in the first state, pass a packet from the first network port to the switching fabric for forwarding to the tool; and
   when the network switch appliance is in the second state, pass the packet from the first network port to the second network switch appliance via the second network port, bypassing the switching fabric;
   wherein the packet originates from the node on the computer network and is received at the network switch appliance via the first network port.

6. The network switch appliance of claim 4, wherein the bypass switch is configured to:
   when the network switch appliance is in the first state, pass a packet from the switching fabric to the tool via the tool port; and
   when the network switch appliance is in the second state, pass a packet received from the second network switch appliance via the third network port to the tool via the tool port, bypassing the switching fabric;
   wherein the packet originates from the node on the computer network and is received at the network switch appliance via the first network port.

7. The network switch appliance of claim 1, wherein the bypass switch includes a relay and is configured to:
   open the relay when the network switch appliance is in the first state; and
   close the relay when the network switch appliance is in the second state.

8. The network switch appliance of claim 1, further comprising a transceiver;
   wherein the bypass switch is communicatively coupled to the switching fabric via the transceiver.

9. The network switch appliance of claim 1, further comprising a controller configured to communicate the state of the network switch appliance to the bypass switch.

10. The network switch appliance of claim 4, further comprising:
    a fourth network port configured to be communicatively coupled with the second network switch appliance; and
    a controller configured to communicate the state of the network switch appliance to the second network switch appliance via the fourth network port.

11. The network switch appliance of claim 1, wherein the network switch appliance is configured to be communicatively coupled with the second network switch appliance as part of a system of a plurality of redundant network switch appliances, wherein the network switch appliance is configured to operate as primary with the second network switch appliance as a backup for packet forwarding to the tool.

12. The network switch appliance of claim 11, wherein the network switch appliance is configured to operate as a backup for packet forwarding to a second tool communicatively coupled to the second network switch appliance.

13. The network switch appliance of claim 1, further comprising a controller configured to detect a state of the network switch appliance, wherein:
    the first state is detected if the operation of the network switch appliance satisfies a specified criterion; and
    the second state is detected if the operation of the network switch appliance does not satisfy the specified criterion.

14. The network switch appliance of claim 1, the tool being an in-line tool.

15. The network switch appliance of claim 1, the tool being a network monitoring tool.

16. A method comprising:
    detecting, by a network switch appliance, a state of the network switch appliance, the network switch appliance including a bypass switch and a switching fabric communicatively coupled to the bypass switch; and
    configuring an internal switching configuration of the network switch appliance based on the detected state, including:
       when a first state of the network switch appliance is detected, configuring the bypass switch to complete a communication path between a tool and a node on a computer network via the switching fabric; and
       when a second state of the network switch appliance is detected, configuring the bypass switch to complete a communication path between the tool and the node on the computer network via a second network switch appliance so as to bypass the switching fabric;
    the tool, node, and the second network switch appliance being external to the network switch appliance.

17. The method of claim 16, further comprising:
    communicating the state of the network switch appliance to the second network switch appliance.

18. The method of claim 16, wherein configuring the bypass switch to complete the communication path between the tool and the node on the computer network via the switching fabric includes configuring the first bypass switch to:
    receive a packet from the node on the computer network via a first network port of the network switch appliance;
    pass the packet to the switching fabric for forwarding to the tool;
    receive the forwarded packet from the switching fabric; and
    pass the forwarded packet to the tool via a tool port of the network switch appliance.

19. The method of claim 16, wherein configuring the bypass switch to complete the communication path between the tool and the node on the computer network via the second network switch appliance includes configuring the bypass switch to:
    receive a packet from the node on the computer network via a first network port of the network switch appliance;
    pass the packet to the second network switch appliance via a second network port of the network switch appliance, bypassing the switching fabric;
    receive the packet returned from the second network switch appliance via a third network port of the network switch appliance; and pass the returned packet to the tool via a tool port of the network switch appliance, bypassing the switching fabric.

20. The method of claim 16, wherein the network switch appliance is communicatively coupled with the second network switch appliance as part of a system of a plurality of redundant network switch appliances, and wherein the network switch appliance operates as a primary and the second network switch appliance operates as a backup for packet forwarding to the tool.

21. A method comprising:
configuring a first network switch appliance based on a detected state of a second network switch appliance, the first network switch appliance including a switching fabric communicatively coupled to a bypass switch;
wherein configuring the first network switch appliance includes:
when a first state of the second network switch appliance is detected, configuring the bypass switch to complete a communication path between the second network switch appliance and a node on a computer network, to bypass the switching fabric; and
when a second state of the second network switch appliance is detected, configuring the bypass switch to complete a communication path between the second network switch appliance and a tool via the switching fabric, the tool communicatively coupled to the second network switch appliance;
the tool, node, and second network switch appliance being external to the first network switch appliance.

22. The method of claim 21, further comprising:
detecting the state of the second network switch appliance based on a signal received from the second network switch appliance.

23. The method of claim 21, wherein configuring the bypass switch to complete a communication path between the second network switch appliance and the node on the computer network includes configuring the bypass switch to close a relay to:
receive a packet from the second network switch appliance via a first network port of the first network switch appliance; and
pass the packet to the node on the computer network via a second network port of the first network switch appliance.

24. The method of claim 21, wherein configuring the bypass switch to complete a communication path between the second network switch appliance and the tool via the switching fabric includes:
configuring the bypass switch to open a first relay to:
receive a packet from the second network switch appliance via a first network port of the first network switch appliance; and
pass the packet to the switching fabric; and
configuring the bypass switch to open a second relay to:
receive the packet from the switching fabric; and
pass the packet to the tool via a the second network switch appliance, so as to bypass a switching fabric of the second network switch appliance.

25. The method of claim 21, wherein the first network switch appliance is communicatively coupled with the second network switch appliance as part of a system of a plurality of redundant network switch appliances, and wherein the second network switch appliance operates as primary and the first network switch appliance operates as a backup for packet forwarding to the tool.

26. A network switch appliance comprising:
a switching fabric;
a first network port coupled to the switching fabric and configured to be communicatively coupled with a node on a computer network, the node external to the network switch appliance;
a second and third network port coupled to the switching fabric and configured to be communicatively coupled with a second network switch appliance, the second network switch appliance external to the network switch appliance; and
a tool port coupled to the switching fabric and configured to be communicatively coupled with a tool, the tool external to the network switch appliance;
wherein the network switch appliance is in a first state when the network switch appliance is powered and is in a second state when the network switch appliance is unpowered; and
a bypass switch communicatively coupled to the switching fabric, the bypass switch being configured to:
when the network switch appliance is in the first state:
open a first relay to pass a packet from the first network port to the switching fabric for forwarding to the tool; and
open a second relay to pass the forwarded packet from the switching fabric to the tool via the tool port; and
when the network switch appliance is in the second state:
close the first relay to pass the packet from the first network port to a second network switch appliance via the second network port, bypassing the switching fabric; and
close the second relay to pass the packet returned from the second network switch appliance via the third network port to the tool via the tool port, bypassing the switching fabric;
wherein the packet originates from the node on the computer network and is received at the network switch appliance via the first network port.

27. The network switch appliance of claim 26, further comprising:
a controller configured to communicate the state of the network switch appliance to the bypass switch.

28. The network switch appliance of claim 26, further comprising:
a fourth network port configured to be communicatively coupled with the second network switch appliance; and
a controller configured to communicate the state of the network switch appliance to the second network switch appliance via the fourth network port.

29. The network switch appliance of claim 26, wherein the network switch appliance is configured to be communicatively coupled with the second network switch appliance as part of a system of a plurality of redundant network switch appliances, and wherein the network switch appliance is configured to operate as primary with the second network switch appliance as a backup for packet forwarding to the tool.

* * * * *